United States Patent
Stroh

(10) Patent No.: US 9,916,606 B2
(45) Date of Patent: Mar. 13, 2018

(54) SYSTEM AND METHOD FOR PROCESSING A TRANSACTION DOCUMENT INCLUDING ONE OR MORE FINANCIAL TRANSACTION ENTRIES

(75) Inventor: Tim Stroh, Victoria (AU)

(73) Assignee: CASTLE BOOKKEEPING WIZARD PTY LTD, Victoria (AU)

( * ) Notice: Subject to any disclaimer, the term of this patent is extended or adjusted under 35 U.S.C. 154(b) by 238 days.

(21) Appl. No.: 13/447,505

(22) Filed: Apr. 16, 2012

(65) Prior Publication Data

US 2012/0265655 A1  Oct. 18, 2012

Related U.S. Application Data

(60) Provisional application No. 61/476,638, filed on Apr. 18, 2011.

(51) Int. Cl.
  *G06K 9/03* (2006.01)
  *G06Q 30/04* (2012.01)
  *G06Q 40/00* (2012.01)

(52) U.S. Cl.
  CPC .............. *G06Q 30/04* (2013.01); *G06Q 40/00* (2013.01)

(58) Field of Classification Search
  USPC .................................... 705/30, 40; 358/468
  See application file for complete search history.

(56) References Cited

U.S. PATENT DOCUMENTS

| | | | |
|---|---|---|---|
| 4,201,978 A | * | 5/1980 | Nally ............... G06K 9/6217 235/379 |
| 4,264,808 A | | 4/1981 | Owens et al. |
| 4,315,246 A | * | 2/1982 | Milford ................ G06K 9/03 235/449 |
| 5,091,968 A | | 2/1992 | Higgins et al. |
| 5,093,787 A | | 3/1992 | Simmons |
| 5,159,548 A | | 10/1992 | Caslavka |
| 5,517,406 A | | 5/1996 | Harris et al. |
| 5,751,842 A | | 5/1998 | Riach et al. |
| 5,875,435 A | | 2/1999 | Brown |
| 5,910,988 A | | 6/1999 | Ballard |
| 5,926,550 A | | 7/1999 | Davis |
| 5,963,925 A | | 10/1999 | Kolling et al. |

(Continued)

FOREIGN PATENT DOCUMENTS

| | | |
|---|---|---|
| AU | 2003200582 A1 | 9/2004 |
| AU | 2005255397 A1 | 12/2005 |

(Continued)

*Primary Examiner* — Talia F Crawley
(74) *Attorney, Agent, or Firm* — Neal, Gerber & Eisenberg LLP

(57) ABSTRACT

A system for processing a transaction document including one or more financial transaction entries, including a record generation subsystem having data processing means configured to a) receive or generate a complete character string characterizing the financial transaction entries displayed on the document; b) analyze each complete character string to identify known transaction identifiers used in financial transactions; c) analyze each complete character string to identify transaction data strings associated with each identified transaction character string; and d) store transaction data, including the transaction character strings and associated transaction data strings, for each single financial transaction in a database.

15 Claims, 5 Drawing Sheets

(56) References Cited

U.S. PATENT DOCUMENTS

| | | | |
|---|---|---|---|
| 5,969,324 A | 10/1999 | Reber et al. | |
| 6,009,408 A | 12/1999 | Buchanan | |
| 6,029,144 A | 2/2000 | Barrett | |
| 6,054,707 A | 4/2000 | Hou | |
| 6,058,374 A | 5/2000 | Guthrie | |
| 6,058,375 A | 5/2000 | Park et al. | |
| 6,192,165 B1 | 2/2001 | Irons | |
| 6,243,504 B1* | 6/2001 | Kruppa | G06K 7/0004 382/318 |
| 6,367,013 B1 | 4/2002 | Bisbee et al. | |
| 6,397,194 B1 | 5/2002 | Houvner et al. | |
| 6,459,506 B1 | 10/2002 | Hu et al. | |
| 6,654,487 B1* | 11/2003 | Downs, Jr. | G06K 9/03 382/139 |
| 6,831,758 B1* | 12/2004 | Toda | H04N 1/00209 358/440 |
| 7,069,240 B2 | 6/2006 | Spero et al. | |
| 7,200,604 B2* | 4/2007 | Forman | G06F 17/30303 707/692 |
| 7,216,106 B1* | 5/2007 | Buchanan | G06Q 20/042 235/379 |
| 7,263,527 B1 | 8/2007 | Malcolm | |
| 7,295,694 B2* | 11/2007 | Moon | G06K 9/186 235/379 |
| 7,447,347 B2* | 11/2008 | Weber | G06K 9/186 382/139 |
| 7,619,721 B2* | 11/2009 | Jones | G06Q 20/18 356/71 |
| 7,620,231 B2* | 11/2009 | Jones | G06Q 20/042 209/534 |
| 7,848,969 B2 | 12/2010 | Murray | |
| 7,856,403 B2 | 12/2010 | Venturo | |
| 7,881,519 B2* | 2/2011 | Jones | G06Q 20/042 209/534 |
| 7,903,863 B2* | 3/2011 | Jones | G06Q 20/042 235/379 |
| 7,904,801 B2* | 3/2011 | Catorcini | G06F 17/243 715/221 |
| 7,971,139 B2* | 6/2011 | Stanciu | G06F 17/2247 715/230 |
| 8,024,269 B1* | 9/2011 | Ballard | G06Q 10/10 705/35 |
| 8,041,098 B2* | 10/2011 | Jones | G06Q 20/042 382/137 |
| 8,125,624 B2* | 2/2012 | Jones | G06Q 20/18 356/71 |
| 8,126,793 B2* | 2/2012 | Jones | G06Q 20/04 705/35 |
| 8,359,239 B1 | 1/2013 | Cook et al. | |
| 2003/0046093 A1 | 3/2003 | Erickson et al. | |
| 2003/0061132 A1 | 3/2003 | Yu et al. | |
| 2003/0083966 A1 | 5/2003 | Treibach-Heck | |
| 2004/0260629 A1* | 12/2004 | Mintzer | G06Q 30/02 705/30 |
| 2005/0289024 A1 | 12/2005 | Beck | |
| 2007/0208993 A1* | 9/2007 | Ritter | G06F 17/248 715/234 |
| 2011/0137864 A1* | 6/2011 | Deshmukh | G06F 17/30575 707/648 |
| 2012/0185368 A1 | 7/2012 | Schloter et al. | |

FOREIGN PATENT DOCUMENTS

| | | |
|---|---|---|
| AU | 2005255398 A1 | 12/2005 |
| AU | 2005255399 A1 | 12/2005 |
| AU | 2007201777 A1 | 11/2008 |
| AU | 2009250963 A1 | 7/2010 |
| WO | 2001016850 A2 | 3/2001 |

* cited by examiner

SYSTEM AND METHOD FOR PROCESSING A TRANSACTION DOCUMENT INCLUDING ONE OR MORE FINANCIAL TRANSACTION ENTRIES

This application claims benefit of, and priority from, U.S. provisional patent application No. 61/476,638, filed on Apr. 18, 2011 and entitled "System And Method For Processing A Transaction Document Including One Or More Financial Transaction Entries".

FIELD OF THE INVENTION

The present invention relates generally to the processing of transaction documents, such as orders, invoices and receipts, and subsequent operations performed on the processed transaction data.

BACKGROUND

All businesses have a legal requirement to monitor their financial position and to maintain proper financial accounting records. Financial accounting systems, and the reports and summary information that are generated by such systems, are required by business owners in order to meet their obligations to file Goods and Services Tax Statement, Business Activity Statements and Tax Return Statements. In addition, financial reports are required for the most basic of management decisions and determinations regarding profitability of a job, the solvency or viability of the company and the profitability of the business. Businesses of different types have various requirements for following up on outstanding invoices, reconciling various accounts, registering security interests and the like.

Existing financial accounting systems typically involved intensive manual effort and, in instances where automatic processing has been used, intensive user intervention. Typically, a human book keeper is required to interpret paper and electronically transmitted transaction records, categorize them and/or identify, extract, augment and input (by manually keying in or manual selection of variables on screen in drop down or other graphical representations) key transaction data into a computerized accounting system.

Existing financial accounting systems frequently require manual data entry or require the manual categorization of financial transactions where:
1. the communication of transaction details occurs only via paper documentation (e.g. receipts, invoices, etc);
2. the details of the financial transaction are not digitally transmitted in a complete format that includes details such as the amount of tax included in the total value, the nature of the transaction from a financial accounting stand point (e.g. is it a cost of sale, an operating cost, to what General Ledger code should the transaction be assigned, etc.), the specific identify of the other party to a transaction;
3. the details of the financial transaction are not transmitted digitally to a party in a pre-agreed format or using a pre-agreed protocol (the transaction information may be available in a standard format but the two parties have not worked together to define that format or 'integrate' their respective systems); and/or
4. the system transmitting the details and the system receiving the details of the transaction are not linked or integrated in a purpose specific way (e.g. the internet is not a purpose specific linking) with each other enabling additional information regarding the transaction (specifically the identity of the other party to each individual transaction) to be associated with the transaction data or inferred based on the originating node (or system) of the data packet (e.g. the accounting and computer systems of the two or more parties to a transaction are not linked via a network where the linked systems are identified to each other such that the originating system equates to specific information about the transactions from that system, or using an agreed protocol for exchanging complete transaction information).

A human book keeper is often required by existing financial accounting systems to manually interpret transaction information and subsequent manually associate transactions with their counterparts in a double entry accounting system in any situation where this information is not explicitly included in a digital transaction record. Manual interpretation is also required for transaction information and subsequent categorization of transactions within the chart of accounts. Errors or discrepancies are also introduced by the human data entry and manual assignment processes in existing financial accounting systems.

Existing financial accounting systems require the manual creation of unique application and data base rules by each business/user for associating transactions containing specific pre-defined character strings and received in specific formats to particular General Ledger codes as part of the implementation of a new financial accounting system or the transition from one system to another. There is also a requirement by many existing financial accounting systems for the manual creation of unique application and data base rules for use on subsequent transaction by each business/user for associating transactions containing a specific character string (and received in specific format) during the initial manual process of associating a transaction containing that defining string of characters to their counterparts in a double entry system or to a particular account within the chart of accounts.

A common protocol or standard formatting is often required to be used in existing financial accounting systems by parties for exchanging transaction data or transaction information (whether electronically or via paper document).

Transaction participants (e.g. biller and payee) are often required by existing financial accounting systems to utilize a unique code per relationship to enable transactions data to be appropriately entered and/or matched to a business' financial accounting records and/or counterpart in a double entry system or to be recorded within a chart of accounts.

The above and other difficulties have presented challenges to the effective and efficient management of business transactions.

It would therefore be desirable to provide an automated accounting system for processing transaction documents including one or financial transaction entries which ameliorates or overcomes any one or more of these difficulties. It would also be desirable to provide an automated accounting system which is simple, efficient, accurate and/or minimised the requirement for human intervention.

SUMMARY OF THE INVENTION

According to a first aspect of the present invention, there is provided a system for processing a transaction document including one or more financial transaction entries, including:

a record generation subsystem having data processing means configured to:

a) receive or generate a complete character string characterising the financial transaction entries displayed on the document;
b) analyse each complete character string to identify known transaction identifiers used in financial transactions;
c) analyse each complete character string to identify transaction data strings associated with each identified transaction character string; and
d) store transaction data, including the transaction character strings and associated transaction data strings, for each single financial transaction in a database.

In one or more embodiments, the data processing means is further configured to correct and/or authenticate the transaction identifiers and transaction data strings by applying stored correction and/or authentication rules.

In one or more embodiments, the data processing means is further configured to:
perform optical character recognition on the document to generate the complete character string.

In one or more embodiments, the data processing means is further configured to:
analyse each complete character string to determine if document represents more than one transaction, and if so, breaking the complete character string into individual transaction substrings each corresponding to a single financial transaction.

In one or more embodiments, the data processing means is further configured to:
analyse the layout of the financial transaction entries and related information displayed on the document to identify known patterns of common financial documents.

In one or more embodiments, the financial document is an account statement.

In one or more embodiments, the data processing means is further configured to:
augment the stored transaction data with supplementary transaction data from supplementary data sources.

The supplementary transaction data may include any one of more of: one of the parties engaged in the transaction, and the nature or type of the transaction.

The supplementary data sources may include publicly accessible databases.

In one or more embodiments, one or more of the transaction documents are physical documents.

In one or more embodiments, the record generation subsystem further includes:
a document digitization module for digitizing the physical documents.

In one or more embodiments, one or more of the transaction documents are electronic documents having a known digital document format.

According to another aspect of the present invention, there is provided a system for processing a first transaction document including one or financial transaction entries, including:
a record generation subsystem having data processing means configured to:
a) receive or generate a complete character string characterising the financial transaction entries displayed on the document;
b) analyse each complete character string to identify known transaction identifiers used in financial transactions;
c) analyse each complete character string to identify transaction data strings associated with each identified transaction character string;
d) store transaction data, including the transaction character strings and associated transaction data strings, for each single financial transaction in a database; and
e) augment the transaction identifiers and transaction data strings by accessing previously stored transaction data and/or one or more external databases.

In one or more embodiments, the system further includes:
a reconciliation subsystem having data processing means configured to:
reconcile the stored transaction data from the first transaction document with the stored transaction data from one or more other transaction documents, wherein the stored transaction data from one or more other transaction documents has been obtained for performing steps a) to d) on the one or more other transaction documents.

In one or more embodiments, the previously stored transaction data used in step e) includes the stored transaction data from the one or more other transaction documents.

According to yet another aspect of the present invention, there is provided a system for processing a transaction document including one or financial transaction entries, including:
a record generation subsystem having data processing means configured to:
a) receive or generate a complete character string characterising the financial transaction entries displayed on the document;
b) analyse each complete character string to identify known transaction identifiers used in financial transactions;
c) analyse each complete character string to identify transaction data strings associated with each identified transaction character string;
d) store transaction data, including the transaction character strings and associated transaction data strings, for each single financial transaction in a database; and
e) categorize the transaction identifiers and transaction data strings by carrying out a categorization process including sequence of categorization decisions and actions which involve comparison of the transaction identifiers and transaction data strings to previously stored transaction data and/or one or more external databases.

BRIEF DESCRIPTION OF THE DRAWINGS

The invention will now be described in further detail by reference to the accompanying drawings. It is to be understood that the particularity of the drawings does not supersede the generality of the preceding description of the invention.

DETAILED DESCRIPTION

Figure 1:
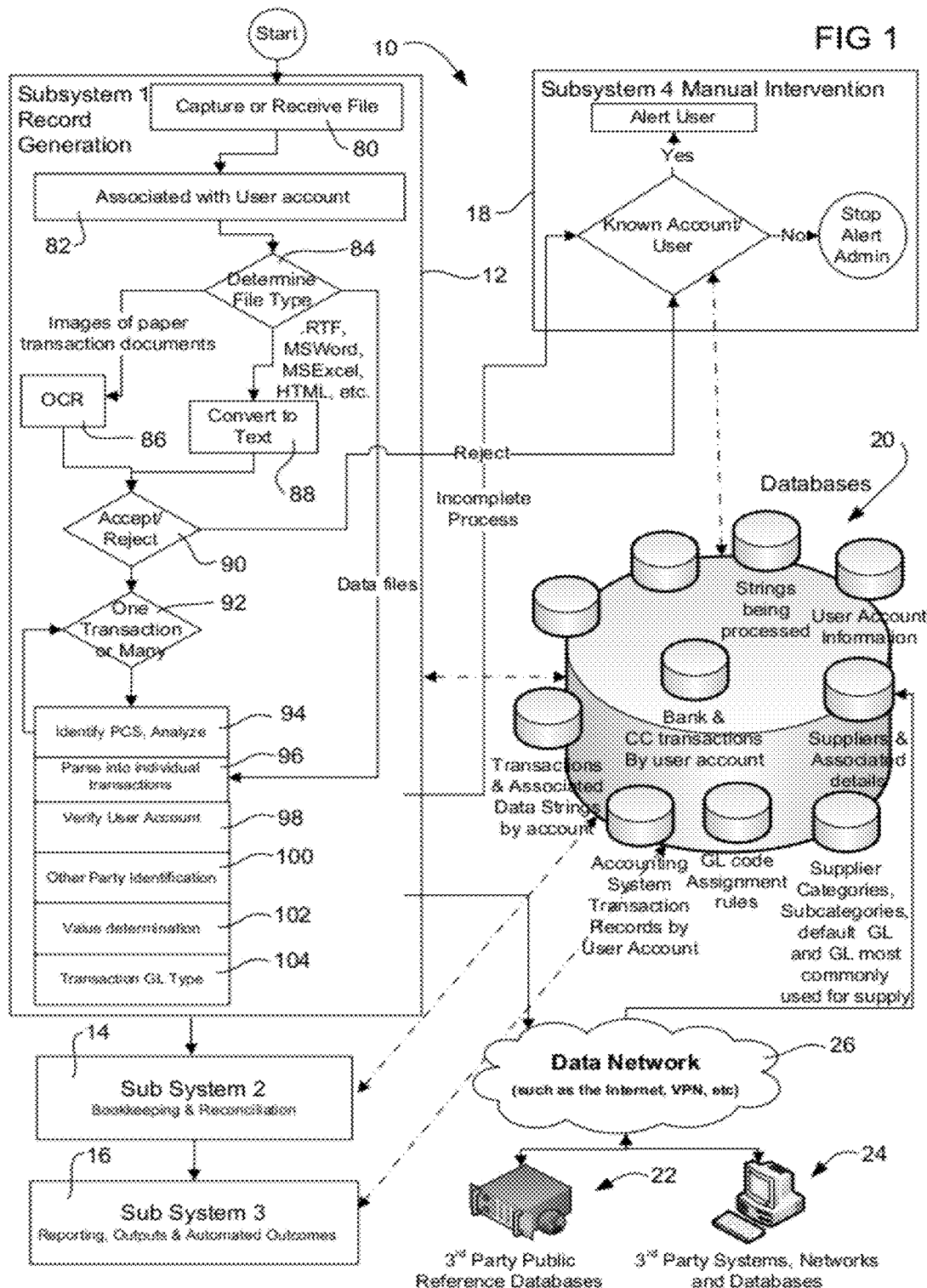
FIG. 1 is a schematic diagram depicting system elements and general process flow in a system according to one embodiment of the present invention.

The system 10 shown in FIG. 1 includes a record generation subsystem 12, a reconciliation subsystem 14, a reporting subsystem 16 and a manual intervention subsystem 18. Each of the subsystems 12 to 18 is in communication with a database bank 20, which is in turn in communication with remote data sources 22 and 24 via a data network 26.

Broadly speaking, the record generation subsystem 12 acts to capture or receive transaction documents including one or more financial transaction entries.

Such transaction documents may be either physical documents, such as paper receipts, or electronic documents, such as data files having a known digital document format such as comma-separately-values (.csv), portable-document-format (.pdf) and the like. The record generation subsystem 12 associates each transaction document with a user account, and then converts the document to a string of characters. The string of characters is analysed and augmented in order to generate individual transaction database entries which are useful to the reconciliation subsystem 14 and reporting subsystem 16.

The reconciliation subsystem 14 acts to match and reconcile transaction database entries and transaction documents from multiple sources, such as from bank account, credit card, $3^{rd}$ party accounting and book-keeping system records. The reconciliation subsystem 14 also acts to update relevant $3^{rd}$ party accounting and book-keeping system records, and assign individual credit card transactions with general ledger (GL) codes.

The reporting subsystem 16 acts to generate a number of reports, statements and the like which are useful to a user, such as travel and expense reimbursement reports and requests, business activity statements, profit and loss reports, and tax summary reports.

The manual intervention subsystem 18 enables a user to establish a user account as well as create new transaction entries or edit existing transaction entries maintained in the database bank 20.

Figure 2:
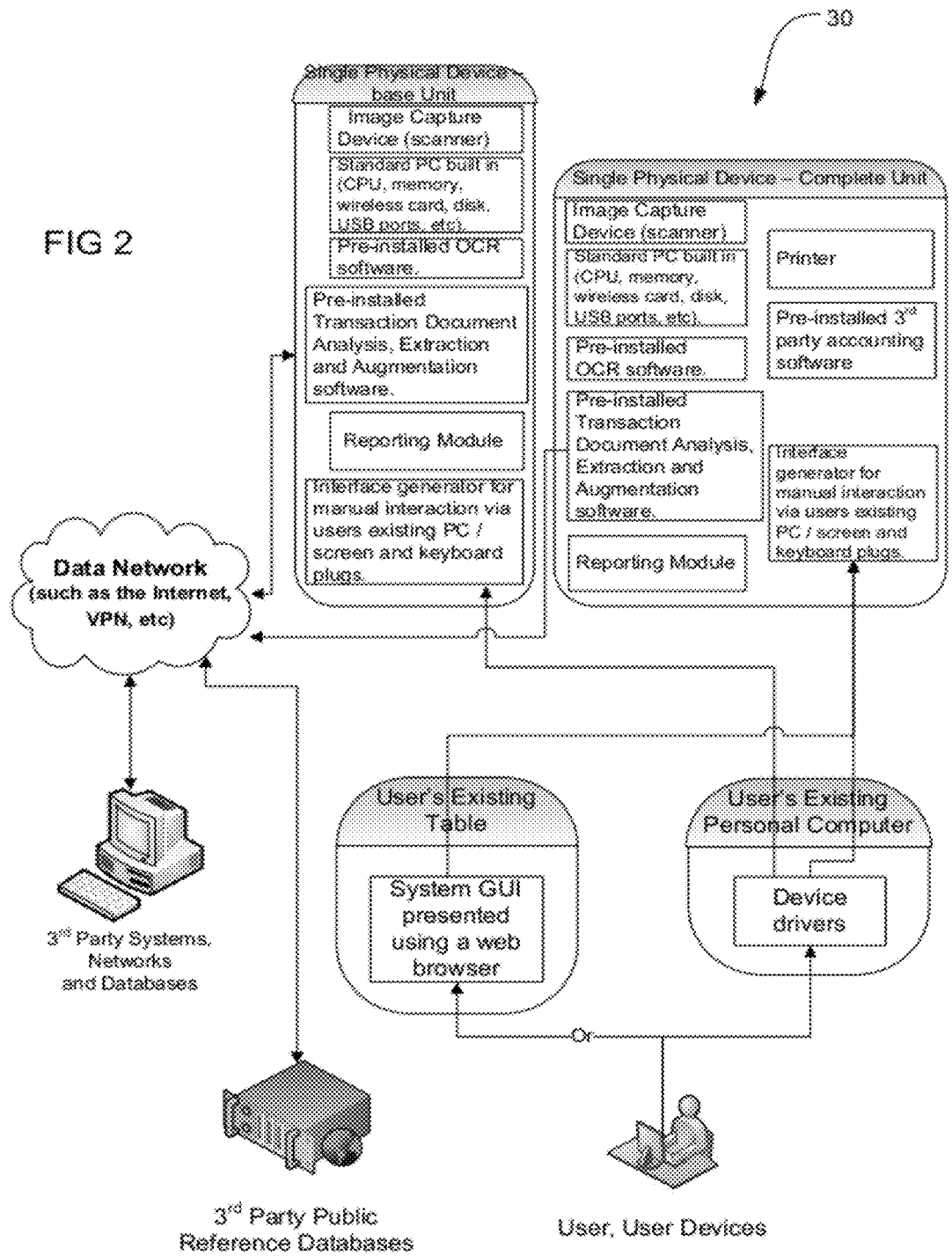
FIGS. 2 to 4 respectively depict alternative implementations of the system shown in FIG. 1 as a complete machine, a Software-as-a-Service (SaaS) configuration and a local installation.
Figure 3:
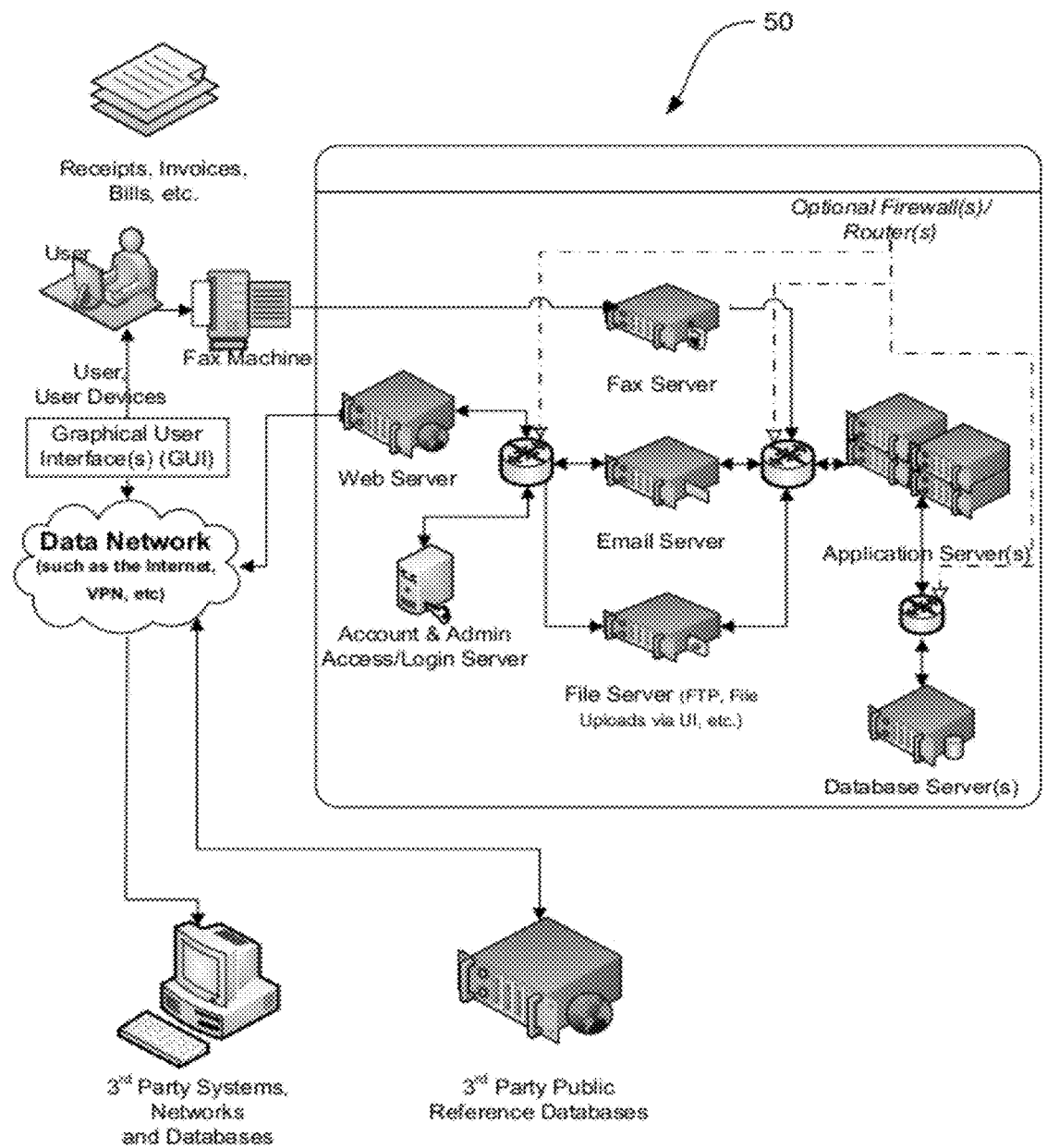
Figure 4:
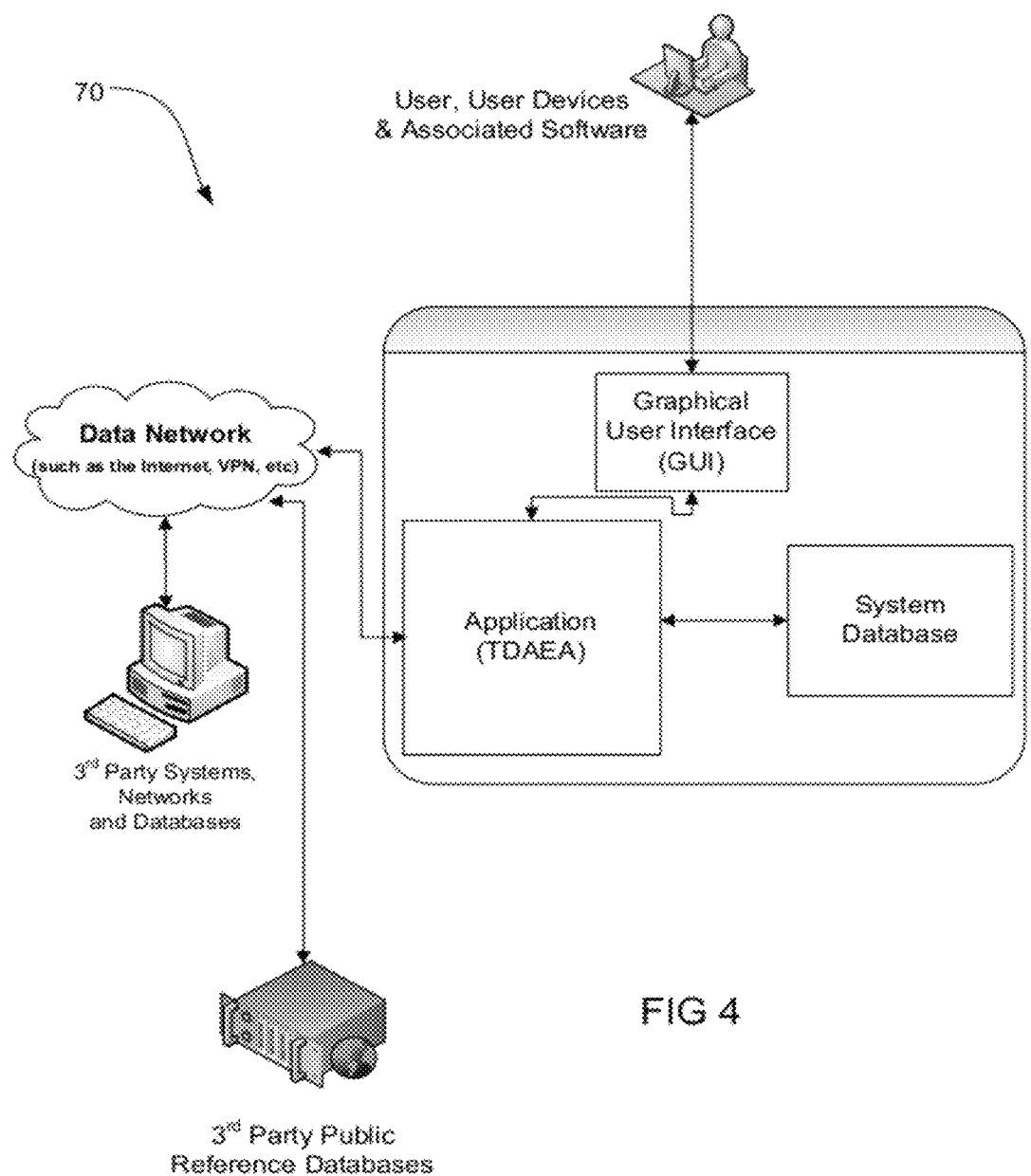

The system 10 may be implemented in a number of alternative ways. FIG. 2 depicts an exemplary complete machine implementation 30 of the system 10 shown in FIG. 1, FIG. 3 depicts an exemplary Software-as-a-Service (Saas) implementation 50 of the system 10 shown in FIG. 1, and FIG. 4 depicts an exemplary local installation implementation 70 of the system 10 shown in FIG. 1.

Record Generation Subsystem

Despite the diversity of formats for receipts, invoices, bills, and common transaction documents, virtually all transaction documents have a number of shared features. These features include common reoccurring words (or character strings) and patterns of presentation. The record generation subsystem 12 acts to generate a complete character string for each document characterising the financial transaction entries and the layout of the financial transaction entries and related information displayed on the document. Each complete character string is then analysed to identify known transaction character strings used in financial transactions. Each complete character string is next analysed to identify transaction data strings associated with each identified transaction character string.

Each complete character string is then analysed to determine if the document represents more than one transaction, and if so, the complete character string is broken up into individual transaction substrings each corresponding to a single financial transaction. Finally, transaction data, including the transaction character strings and associated transaction data strings, for each single financial transaction is stored in a database for performing subsequent accounting operations.

Various processing steps carried out by the record generation system 12 are depicted in FIG. 1. After activating a User account or complete machine system, the record generation subsystem 12, at step 80, captures or receives a file i.e. an image of paper transaction document, such as a scan directly from scanner or as attachment to email. Alternatively, the record generation system 12 receives a data file of transactions (e.g. CSV format file, bank statement, 3rd party accounting software file). At step 82, the received file is associated with a user account based on a local user system registration or receiving email address for an SaaS implementation (or account number in subject line of email, sending email address or sending fax #), a unique file name assigned and then the file is saved in stored in the database bank 20.

A database entry is created by the record generation subsystem 12, recording key information described in table 1 below:

TABLE 1

File name—unique file name given by system to each file received and saved to memory
Original file name (if email attachment, file upload, etc the name the file had when received and before saved)
Location file saved to
how the source file was received (direct scan, email, fax, uploaded via web page)
The receiving email address, fax number, mobile phone number, login and password or associated user account used to upload a file, etc.
Sending email address, fax number, mobile phone number, remote machine number
Subject line (if email)
Originating IP address (if email)
Date and time file received
Date and time file sent (if email)
User account associated with receiving email address, fax, login and password, account number appear in the subject line if an email
User account associated with sending email address, mobile, fax, login and password, account number appearing in the subject line if an email, user machine number, etc.
Does User Account associated with receiving and sending match?
User Account indicated by Stage 1
Source file type (e.g. gif, jpg, RTF, .csv, MS Word doc, MS excel doc, etc.)

The record generation subsystem 12 will then route the file for processing based on its type. If the record generation subsystem 12 determines, at step 84, that a digital image files (such as .jpg or .gif) corresponding to a scanned paper document was received, then an optical character recognition (OCR) process is carried out at step 86. However, if the file received was an electronic document having a known digital document format, such as an MS Word document or other non-image document, but not a data file such as a CSV file, then conversion of the file to character string is carried out at step 88.

OCR of Image Files/Conversion of Files to Characters Strings

For digitized images of transaction documents, the record generation system 12 then applies OCR to the digitized image or the conversion of other non-data file electronic document formats (such as .pdf, RTF, MS Word, etc) to a single character string containing all characters, spaces and line breaks or carriage returns in the document (unique special characters may be inserted for each space, line break, etc). These character strings are then recorded in the database bank 20 in association with all information captured on receipt of the original file.

The OCR system utilized should preferably either provide page formatting information and give relative position (such as spaces from the left margin to the initial recognized character) or it should preferably provide a pixel count or other indicator for the space between the left margin and the initial character, as well as for the average character width and each space that appears in any line between characters. This information can then be converted to give an accurate number of space characters to insert before, between and after any recognized characters.

In the case of image files having been subject to an OCR process, to address variable methods of scanning or digitizing and various quality of print in original transaction documents, a second step is preferably used to determine if the digital imaging and OCR processes have been effective. To do this, the record generation system assesses the data string, and accept or reject it, as well as recording additional information such as the rotation in degrees that yielded the optimal recognized output and, if specific Off Angle Preferred Character Strings (OAPCS) are identifiable in the strings created when the page was at a rotation other than of optimal recognition.

Accept or Reject OCR Output

The basic accept or reject process is undertaken by the record generation subsystem 12 on a page by page basis for each page within the file received. This process is as follows:
1. Determine the percentage of characters recognized.
2. Determine the percentage of character strings recognized (e.g. complete character strings recognized by a standard spell check system for the language of the account/user where the string is recognized as a word not requiring correction, strings from the OCR not recognized as correctly spelled are exact matches to strings found in the User's account data set of transaction strings or by comparison to strings found in all users account datasets).
3. Rotate the page image 1 degree right and iterate until the document has been OCRd through 360 degrees.
4. Determine at what degree of rotation, the maximum number of character strings is recognizable.
5. In the rotation with the highest percentage of characters and character strings identifiable, is the percentage recognized above the minimum?
6. If no, alert user and pass the image and associated transaction document for manual intervention via the manual intervention subsystem 18.
7. If yes,
   a. Record the optimal page sub string
   b. Augment the substring by inserting or recording the generated information (with all inserted data bounded by Unique Marker Characters (UMC) if augmentation data is inserted in the string rather than recorded in the database in a fashion related to the string):
      i. The degree of rotation of the page that resulted in the optimal percentage of characters, words, PCS, etc recognized.
      ii. Any OAPCS found within any string created from any rotation of the page other than the optimal.
      iii. The page number of that page and the total number of pages in the file received.
      iv. Ensure a page break character is the final character in the substring saved for each page.
8. Temporarily store each optimal/accepted page specific substring until all pages have been accepted or rejected.
9. Combine the augmented optimal character strings for each page of the source file together to create a Complete Character String (CCS) for the whole file received in a single extended character string containing all characters, spaces, carriage returns or line breaks, page breaks and inserted data bounded by special characters (e.g. optimal degree of rotation, page number, OAPCS found, account numbers occurring in $1^{st}$ line of any page found, and so on).

Following OCR the database entry associated with each received file will have been augmented and will include information set out in Table 2 below:

TABLE 2

All data described in Table 1
A Complete Character String generated from combining the optimal page specific strings generated by OCR for each page of the file. In addition, the Complete String will have been augmented with page numbers and at the end of each page substring page break characters and either associated with additional derived data or augmented at the beginning of each page substring with the degree of rotation that generated the optimal string for that page with this inserted information bounded by UMC (unique characters).
For each page sub string, Off Angle PCS found (at any rotation other than the optimal OCR alignment for that page) and the degree of rotation that these OAPCS were found at will also be recorded in a way associated with the page substring or added to the string and also bounded by unique character markers.

If Off Angle Preferred Character Strings (OAPCS) are identifiable, then the information set out in Table 3 below will be included:

TABLE 3

Alphanumeric string corresponding uniquely to a User Account Number or Code
Alphanumeric string corresponding uniquely to standard Date formats (any complying date formatted strings DD/MM/YYYY, DD Month, DD Month, YY, DD Month, YYYY, etc)
"Not Negotiable"
"Paid"
"Faxed"

Initial PCS Review & Augmentation with Character Counts

At step 90, Meta Strings comprising all OCR data are extracted by the record generation subsystem 12 from each received file for analysis and further augmentation, in the manner set out below:

1. Line numbers, bounded by Unique Marker Characters (UMC), will be inserted at the beginning of each line (as the very first character in any CCS and following each line break character).
2. Preferred Character Strings (PCS)—that is, character strings which are known to be used in financial transaction entries—will then be searched for in the complete character string. PCS for the Australian User include but are not limited to those found in table 5 below. A table of PCS will exist for each country or market. PCS found within each string will be recorded in association with their source document, page number, line number and the count of characters in that line from the left margin to the first character in the PCS, to the last character in the PCS and to a midpoint between the first and last character in the PCS. Two midpoints will be determined, A and B.
3. Associated PCS Data (APCSD)—that is, transaction data strings associated with each identified transactions character string—being data that conforms to the rules for data in an appropriate format, character type, number of characters, etc unique to each specific PCS will then be identified. Associated data will be extracted and recorded in association with its PCS anchor as well as its source document, page number, line number and the count of characters in that line from the left margin to the first character in the APCSD, to the last character in the APCSD and to a midpoint between the first and last character in the APCSD. Sample rules for APCSD associated with specific PCS can be found in Table 6 below.
4. The OCR PCS correction module will then be run.
5. PCS and associated conforming PCS data (APCSD) will then be looked for a second time and the corrected and now identified PCS and APCSD will then be recorded as described above.
6. Character counts per line and per page will then be determined as described (but not limited to those) in table 5.
7. In addition, each string or substring of characters is analyzed for reoccurring patterns and specific common transaction structures.

TABLE 4

All data described in Table 1
A Complete Character String generated from combining the optimal page specific strings generated by OCR for each page of the file. In addition, the Complete String will have been augmented at the beginning of each page substring with the degree of rotation that generated the optimal string for that page with this inserted information bounded by UMC (unique characters).
For each page sub string, Off Angle PCS found (at any rotation other than the optimal OCR alignment for that page) and the degree of rotation that these OAPCS were found at will also be added to the string and also bounded by unique character markers.
All PCS, APCSD and associated character counts from left margin
Page numbers, line numbers
Page and line counts In order to achieve the foregoing, the record generation subsystem 12 is configured to receive a complete character string, such as a comma-separated-values file, or a generate a complete character string, for example, by digitizing a paper document, characterising the financial transaction entries displayed on the document.

The record generation subsystem 12 then analyses each complete character string to identify known transaction identifiers (herein called Preferred Character Strings or PCSs) used in financial transactions, analyses each complete character string to identify transaction data strings (herein called Associated PCD Data) associated with each identified transaction character string, and corrects and/or authenticates the transaction identifiers and transaction data strings by applying stored correction and/or authentication rules). The correction/authentication may be carried out by the PCS and APCSD correction module mentioned here above.

The record generation subsystem 12 then stores transaction data, including the transaction character strings and associated transaction data strings, for each single financial transaction in one of the databases 20.

In one or more embodiments, the data processing means is further configured to perform optical character recognition on the document to generate the complete character string.

In one or more embodiments, the data processing means is further configured to analyse each complete character string to determine if document represents more than one transaction, and if so, breaking the complete character string into individual transaction substrings each corresponding to a single financial transaction.

In one or more embodiments, the data processing means is further configured to analyse the layout of the financial transaction entries and related information displayed on the document to identify known patterns of common financial documents.

In one or more embodiments, the financial document is an account statement.

In one or more embodiments, the data processing means is further configured to augment the stored transaction data with supplementary transaction data from supplementary data sources.

The supplementary transaction data may include any one of more of: one of the parties engaged in the transaction, and the nature or type of the transaction.

The supplementary data sources may include publicly accessible databases.

In one or more embodiments, one or more of the transaction documents are physical documents.

In one or more embodiments, the record generation subsystem further includes:

a document digitization module for digitizing the physical documents.

In one or more embodiments, one or more of the transaction documents are electronic documents having a known digital document format.

Identifiable Data Strings/Preferred Character Strings

Table 5 below shows some, but not all, of the PCS for Australian user financial transaction documents. A unique list will exist per market and the list will be augmented from time to time.

TABLE 5

PCS and Variations (strings preceded by a space and followed by a space or colon or semin colon)

(0*), 1800, 1300
ABN, A.B.N., ABN:
Account Number
Amount
Amount Due
$ (Any currency symbol)
Approved, Authorized, Auth Number
Balance Due
Biller Code
Billpay Code
Bpay
Cash
Change, cg (where line prior less line before that equals number in the line
with cq, variations)
Cheque, chq, cheque no. cheque #, chq no. chq #, bank cheque, bank check, check
Current Charges
Customer Number
Discount
/##/##, ##.##.##, ##.##.####, ## Month, Year, etc.
:##, ##:##:##, a.m., p.m.
Fax
Fee
Fee Paid
For and on behalf of
Gross amount
GST
GST exclusive, ex GST, exGST, excludes GST, GST excluded
GST in this invoice
GST inclusive, incGST, includes GST, GST included in Total
IBAN
Invoice
Invoice Number
Late Notice
Net amount
Not Negotiable
Or bearer
Pay the bearer
Pay the sum of
Payment Due
Payment Options
Phone
Pty Ltd, Pty. Ltd., PtyLtd,
Purchase, Pur, Pur:, Purchase:, Purchase;
Receipt, Receipt Number followed by a space followed by string of digits
Reminder
Reminder Notice
Rounding
Signature
Statement
Street
SubTotal
SWIFT, Swift code
Tax Invoice
Terminal ID, Term ID, Term
This Bill
To our charges, To: our charges, To: our professional costs and fees, care and attention (*alpha*), To: our fees, To our fees, To our costs, etc
Total
Total GST
Usage and supply charges
Vendor no, Vendor #:, vendor no., vendor number, vendor number:
Vendor reference
Visa, Mastercard, Amex, American Express
Vic, ACT, etc
Post Code
"cr", "dr", "credit", "debit", "st", "tx st", "tx", "fs", "tl", "td", "cg"
Credit
Debit

TABLE 6

| PCS and Variations (strings preceded by a space and followed by a space or colon or semin colon) | Rules for associated data |
|---|---|
| (0*), 1800, 1300 | Phone prefixes followed by phone numbers in Aus (0*) #### #### or ####-####, In USA (###) followed by ### #### or ###-####, or 1800 or 1 800 or 1-800 followed by ### ### or ###-### (in Aus) |
| 0 | For each PCS found, add a field including<br>1. the identified PCS<br>2. the character string that follows if in the same line<br>3. the line number the PCS appears in<br>4. the count of characters and spaces from the start of the line to the first character of the PCS<br>5. count to last character in PCS<br>5. count to the PCS's midpoint<br>5. the associated data string if found (complying with the rules for that PCS)<br>6. the line number of the complying data<br>7. the count to the complying data's first character<br>8. the count to the complying data's last character<br>9. the count to the mid point of the complying data |
| ABN, A.B.N., ABN: | followed by 11 numbers exactly ## ### ### ### or ########### or ## ######### |
| Account Number | Credit Card numbers, bank account numbers, partial credit card numbers that either match an account number within the User's account data set or comply with known account number formats. |
| Amount | Amount where amount is the only value with a currency, WhereTransDocType<=>Bills - where it is the highest amount, where the currency amount that follows complies with the rules for "Total" |
| Amount Due | followed by a currency symbol and #*.## or #* or just #*.## or #* or where these numerical strings are in the line below or within 3 lines below in the same column (same count, same midpoint) and with no intervening strings |
| $ (Any currency symbol) | followed by #*.## or #* |
| Approved, Authorized, Auth Number | followed by an a numerical or alpha numerical string (no alpha only strings) |
| Balance Due | followed by a currency symbol and #*.## or #* or just #*.## or #* or where these numerical strings are in the line below or within 3 lines below in the same column (same count, same midpoint) and with no intervening strings |

TABLE 6-continued

| PCS and Variations (strings preceded by a space and followed by a space or colon or semin colon) | Rules for associated data |
|---|---|
| Biller Code | followed by an appropriately formatted number string |
| Billpay Code | followed by an appropriately formatted number string |
| Bpay | followed by an appropriately formatted number string |
| Cash | followed by a currency symbol and #*.## or #* or just #*.## or #* |
| Change, cg (where line prior less line before that equals number in the line with cq, variations) | followed by a currency symbol and #*.## or #* or just #*.## or #* |
| Cheque, chq, cheque no. cheque #, chq no. chq #, bank cheque, bank check, check | Followed by a space, colon, semicolon and then a numerical or alpha numerical string (no alpha only strings). |
| Current Charges | followed by a currency symbol and #*.## or #* or just #*.## or #* or where these numerical strings are in the line below or within 3 lines below in the same column (same count, same midpoint) and with no intervening strings |
| Customer Number | Followed by a space, colon, semicolon and then a numerical or alpha numerical string (no alpha only strings). |
| Discount | followed by a % number and with a Currency amount in the same line. |
| ##/##/##, ##.##.##, ##.##.####, ## Month, Year, etc. | String complies with standard date formats. |
| ##:##, ##:##;##, a.m., p.m. | ##:## or ##:##:## or either also followed by a.m. or p.m. where this string or set of strings immediately follows or precedes strings conforming to a date format |
| Fax | "Fax" "F" "F:" followed by appropriately formatted phone number by country. In Australia, for example, (##) #### ####. |
| Fee | followed by a currency symbol and #*.## or #* or just #*.## or #* or where these numerical strings are in the line below or within 3 lines below in the same column (same count, same midpoint) and with no intervening strings |
| Fee Paid | followed by a currency symbol and #*.## or #* or just #*.## or #* |
| For and on behalf of | |
| Gross amount | followed by a currency symbol and #*.## or #* or just #*.## or #* or where these numerical strings are in the line below or within 3 lines below in the same column (same count, same midpoint) and with no intervening strings |
| GST | Where not already identifed as part of a larger GST string variation (e.g. "Total GST") and where it is found in one of the final 4 lines containing currency amounts, followed by a currency value(definitive where it is $1/11$th the largest amount that appears). |
| Total GST | Followed by a currency symbol and #*.## or #* or just #*.## or #* or where these numerical strings are in the line below or within 3 lines below in the same column (same count, same midpoint) and with no intervening strings (currency value in the same line, currency value equals sum of other values in document that have GST in the same line excluding the line containing Total GST) |
| GST exclusive, ex GST, exGST, excludes GST, GST excluded | followed by a currency symbol and #*.## or #* or just #*.## or #* or where these numerical strings are in the line below or within 3 lines below in the same column (same count, same midpoint) and with no intervening strings |
| GST in this invoice | followed by a currency symbol and #*.## or #* or just #*.## or #* or where these numerical strings are in the line below or within 3 lines below in the same column (same count, same midpoint) and with no intervening strings (currency value in the same line, currency value equals sum of other values in document that have GST in the same line excluding the line containing Total GST) |
| GST inclusive, incGST, includes GST, GST included in Total | followed by a currency symbol and #*.## or #* or just #*.## or #* or where these numerical strings are in the line below or within 3 lines below in the same column (same count, same midpoint) and with no intervening strings |
| IBAN | Followed by a space, colon, semicolon and then an appropriately formatted alpha numerical string. |
| Invoice | |
| Invoice Number | Followed by a space, colon, semicolon and then a numerical or alpha numerical string (no alpha only strings). |
| Late Notice | |
| Net amount | followed by a currency symbol and #*.## or #* or just #*.## or #* or where these numerical strings are in the line below or within 3 lines below in the same column (same count, same midpoint) and with no intervening strings |
| Not Negotiable | |
| Or bearer | |
| Pay the bearer | followed by a currency symbol and #*.## or #* or just #*.## or #* |
| Pay the sum of | followed by a currency symbol and #*.## or #* or just #*.## or #* |
| Payment Due | followed by a currency symbol and #*.## or #* or just #*.## or #* or where these numerical strings are in the line below or within 3 lines below in the same column (same count, same midpoint) and with no intervening strings |
| Payment Options | |
| Phone | "Phone" "Ph" "ph:" "P" "P:" followed by appropriately formatted phone number by country. In Australia, for example, (##) #### ####. |
| Pty Ltd, Pty. Ltd., PtyLtd, etc. | |
| Purchase, Pur, Pur:, Purchase:, Purchase; | followed by a currency symbol and #*.## or #* or just #*.## or #* |

TABLE 6-continued

| PCS and Variations (strings preceded by a space and followed by a space or colon or semin colon) | Rules for associated data |
|---|---|
| Receipt, Receipt Number | Followed by a space, colon, semicolon and then a numerical or alpha numerical string (no alpha only strings). |
| Reminder | |
| Reminder Notice | |
| Rounding | followed by a currency symbol and 0.## or .## |
| Signature | |
| Statement | |
| Street, Court, Road, St. Ct. Circle, etc | |
| SubTotal | Followed by a space, colon, semicolon and then currency symbol and #*.## or #* or just #*.## or #* or where these numerical strings are in the line below or within 3 lines below in the same column (same count, same midpoint) and with no intervening strings |
| SWIFT, Swift code | Followed by a space, colon, semicolon and then an alpha numerical string (no alpha only strings). |
| Tax Invoice | |
| Terminal ID, Term ID, Term | Followed by a space, colon, semicolon and then a numerical or alpha numerical string (no alpha only strings). |
| This Bill | Followed by or with an amount in the same count or same midpoint +/−3 in the line below or up to 4 lines below . . . with no other character strings immediately below. |
| Total, To our charges, To: our charges, To: our professional costs and fees, care and attention (*alpha*), To: our fees, To our fees, To our costs, etc | On its own or followed by space, colon, semicolon and a currency value (currency symbol followed by #*.## or simply #*.##). Doc Type is Professional Services invoice. "Total", "To our charges", "Tender" or variation followed by an amount or in a line with an amount, or in the line immediately preceding the line that contains the currency formatted number string that is the largest amount on the document. Followed by a space, colon, semicolon and then a currency value (currency symbol followed by #*.## or simply #*.##) (no alpha only strings). This is the largest value on the document. Unless the word "discount" appears in the lines that immediately follow (next 5) where discount is also associated with an amount and where the Total amount less the discount amount equals the next highest amount. |
| Usage and Supply charges | |
| Vendor no, Vendor #:, vendor no., vendor number, vendor number: | Followed by a space, colon, semicolon and then a numerical or alpha numerical string. |
| Vendor reference | Followed by a space, colon, semicolon and then a numerical or alpha numerical string. |
| Visa, Mastercard, Amex, American Express | followed by a currency symbol and #*.## or #* or just #*.## or #* or where these numerical strings are in the line below or within 3 lines below in the same column (same count, same midpoint) and with no intervening strings (currency value in the same line, currency value equals sum of other values in document that have GST in the same line excluding the line containing Total GST) OR where it is followed by an appropriately formatted number string or abreviated number string using wild cards and showing the first and final 3 digits with wilde cards in between or the final four digits preceded by wilde cards where the digits match that for a credit card account associated with the User account (not alpha numeric) #* *** *### |
| Vic, ACT, etc | States and State name abbreviations for relevant country of User account |
| Post Code | Followed by a space or comma and then an appropriately formatted numerical or alpha numerical string (Australia—four numbers, the UK Six alpha numeric characters often in a ### ### format, United States either 5 digits or 9 digits where the 9 digit format appears as ##### #### or #####-####). |
| "cr", "dr", "credit", "debit", "st", "tx st", "tx", "fs", "tl", "td", "cg" | where the string is immediatley preceded or followed by a currency amount w/or w/out a currency symbol and where the currency amount (and this string) is the only or last item in the line? |
| Credit | |
| Debit | |

OCR Introduced Error Correction of PCS

After an initial review for PCS in each string, the record generation subsystem 12 will correct errors likely introduced by the OCR process. OCR applied to any type of document, where the system would be unable to ascertain or know if a misspelled word or unrecognized sequence of characters within a document was properly recognized or if the OCR system had misinterpreted the characters, the knowledge the all documents being processed by the system are financial transaction documents, enables us to recognize many strings where the OCR system is likely to have misinterpreted a character and to then correct these.

The record generation subsystem 12 will do this using the rules set out in Table 7 below:

TABLE 7

| PCS and Variations (strings preceded by a space and followed by a space or colon or semin colon) | Correction Rules |
|---|---|
| 0 | Search for any alpha string that has a majority of characters identical and where all matching characters are in the correct position. |

TABLE 7-continued

| PCS and Variations (strings preceded by a space and followed by a space or colon or semin colon) | Correction Rules |
|---|---|
| 0 | Search for any string that is formatted appropriately as a currency or phone number string except for the appearance of one or two alphabet characters in lieu of number characters. For currency formatted amounts, is there another number string in the document that is identical except for the OCR introduced error alpha characters. If so, substitute the number string for the alpha numeric string containing the error, (e.g. $ 112.50 appears as does $11Z.50, substitute $112.50 for $11Z.50). For phone numbers are there two appearances of a formatted phone number that are identical except for alpha characters in either (0U) 9555 5555 appears as does (04) 9555 S555, substitute (04) for (0U) and 5 for S to create a single numeric phone number (04) 9555 5555. |
| ABN, A.B.N., ABN: | ABN PCS is followed by an 11 character alpha numeric string or string set rather than strictly numeric. |
| Account Number | |
| Amount | |
| Amount Due | If followed by an otherwise correctly formatted currency amount (except for one alpha character) - and two other currency values in the transaction document sum to a currency amount that would otherwise be equal to the currency amount with the alpha character - correct using the sum. |
| $ (Any currency symbol) | |
| Approved, Authorized, Auth Number | |
| Balance Due | If followed by an otherwise correctly formatted currency amount (except for one alpha character) - and two other currency values in the transactiond document sum to a currency amount that would otherwise be equal to the currency amount with the alpha character - correct using the sum. |
| Biller Code | |
| Billpay Code | |
| Bpay | |
| Cash | |
| Change, cg (where line prior less line before that equals number in the line with cq, variations) | |
| Cheque, chq, cheque no. cheque #, chq no. chq #, bank cheque, bank check, check | |
| Current Charges | |
| Customer Number | Use a traditional spell checking algorithm to determine if the number is virtually identicle to a customer number associated with the User Account and one or more identifying character strings in the transaction document (e.g supplier name, ABN, etc) |
| Discount | Is the currency amount a % of the currency amount in the prior line. This can correct a alpha numeric string preceding a % or "Percentage". Is the % a number, if so, does that % of the currency amount in the line prior equal a corrected currency amount in the same line except for the one alpha character incorrectly appearing in the currency amount of the discount line |
| ##/##/##, ##.##.##, ##.##.####, ## Month, Year, etc. | Spell check and accept a spelling correction for any proper month name. For any date properly formatted except for year where an alpha character appears in leue of one digit. Where the alpha character appears in any digit space but the last, substitue what would be appropriate for the current year. Where the final digit has the alpha character, substitute the current year unless the month in the transaction document is one of the tenth (Oct) through the twelfth (Dec) and the current month is the first (Jan) through the sixth (June) in which case correct using the prior year. |
| ##:##, ##:##;##, a.m., p.m. | are there two time formatted strings that are identicle except for one or two alpha characters . . . create one complete numerical time stamp based on just number characters that appear in the two strings. |
| Fax | |
| Fee | |
| Fee Paid | |
| For and on behalf of | Accept spell check correction to this |
| Gross amount | |
| GST | Correct *ST, G*T, GS* where what follows is a currency amount. |
| GST exclusive, ex GST, exGST, excludes GST, GST excluded | Correct *xGST, e*GST, in**ST, *ST, G*T, GS* where what follows is a currency amount. |
| GST in this invoice | |
| GST inclusive, incGST, | |

TABLE 7-continued

| PCS and Variations (strings preceded by a space and followed by a space or colon or semin colon) | Correction Rules |
|---|---|
| includes GST, GST included in Total | |
| IBAN | |
| Invoice | Accept spell check correction to this |
| Invoice Number | Accept spell check correction to this |
| Late Notice | Accept spell check correction to this |
| Net amount | |
| Not Negotiable | Accept spell check correction to this |
| Or bearer | Accept spell check correction to this |
| Pay the bearer | Accept spell check correction to this |
| Pay the sum of | Accept spell check correction to this |
| Payment Due | Accept spell check correction to this |
| Payment Options | Accept spell check correction to this |
| Phone | |
| Pty Ltd, Pty. Ltd., PtyLtd, | Correct any two characters. (NOTE string that precedes is company name) |
| Purchase, Pur, Pur:, Purchase:, Purchase; | |
| Receipt, Receipt Number followed by a space followed by string of digits | |
| Reminder | Accept spell check correction to this |
| Reminder Notice | Accept spell check correction to this |
| Rounding | |
| Signature | Accept spell check correction to this |
| Statement | Accept spell check correction to this |
| Street | |
| SubTotal | |
| SWIFT, Swift code | |
| Tax Invoice | E.g. "*ax Invoice" "x Invoice" "Tax Inv*e". When any of these strings is found, replace it with "Tax Invoice" |
| Terminal ID, Term ID, Term | |
| This Bill | |
| To our charges, To: our charges, To: our professional costs and fees, care and attention (*alpha*), To: our fees, To our fees, To our costs, etc | |
| Total | *otal, T*tal, To*al, Tot*l, Tota*, or any two OCR mistakes where the string is followed by a currency amount tal, Tal, Tol, Tot followed by $#*.## |
| Total GST | |
| Vendor no, Vendor #:, vendor no., vendor number, vendor number: | Accept spell check correction to "Vendor" and "Number" |
| Vendor reference | Accept spell check correction to this |
| Visa, Mastercard, Amex, American Express | |
| Vic, ACT, etc | Spell check and accept a spelling correction for any proper state name or state abbreviation where first digit of post code confirms correct state. |
| Post Code | Post codes where first digit is alpha in a country where all post codes are numeric (e.g. Aus, USA) first digit can be corrected by referencing any state name or state abbreviation that appears. |
| "cr", "dr", "credit", "debit", "st", "tx st", "tx", "fs", "tl", "td", "cg" | |
| Credit | Accept spell check correction to this |
| Debit | Accept spell check correction to this |

Character Counts and Pattern Recognition

Specifically, for each line in each page, the information set out in Table 8 below will be recorded by the record generation subsystem 12 (either the record augmented or the data recorded and associated with the page string) in the database bank 20:

TABLE 8

The count of characters and spaces between the left margin and first character recognized in the line The count of characters and spaces between the left margin and the last character recognized in the line (count of characters n line)

TABLE 8-continued

The count of characters to the midpoint of the first and last recognized characters
Determine Midpoint A (½ of count left margin to last character in line).
Determine Midpoint B (½ count of text strings in the line plus count from left margin to first
character).
The count of characters in each string and the spaces in between them in each line where
there are no gaps of 3+ spaces between any two character strings.
The sum of the number of spaces between the left margin and first character and ½ of the
count of characters in each string and the spaces in between them in the line where there
were no gaps of 3+ spaces between any two character strings in the line.
For lines with a number, or "cr", "dr", "credit", "debit", "st", "tx st", "tx", "fs", "tl", "td", "cg"
preceded by a number as the last character or character string, is the character immediately
preceding the number a currency symbol?
What is the count of characters and spaces to the final currency amount string in each line?
Count to first character of string after any set of 3+ spaces in any line.
Count to last character of string following any set of 3+ spaces in any line.
Determine if columns in page. Count gaps of 3+ spaces between text strings in the line. Count
to 1st character after each gap.
Count to last character in first string in line and each string after a gap.
Count to last character in line.
How many "Gaps" are there (e.g. 3+ spaces with character string following)?
Is this the same as the line before? As the line after? As what number of lines before? What
number of lines after? As another line in the transaction? As the next line with content?
<<<<Count of number of characters and spaces between start (e.g. initial character space on
the initial line or initial character space following a carriage return) and the last character or
next carriage return.>>>>
<<<<<Following each line number, between UMC, each line will be augmented with the
above data>>>
Identify any currency symbols in line, any number strings in currency format (e.g. #*.##).
Count to each currency symbol.
Count to last character of each currency amount.
Count of sequential lines with multiple counts of the same item that are the same (excluding
1st and last character count).
Count of non-sequential lines between each page break with multiple counts of the same
items the same.
Count of non-sequential lines with each set of matching counts.
Count of lines between each non-sequential but matching format line.

Pattern Recognition, Statement Data Identification and Parsing

Accepted text strings will then be reviewed to identify common financial document patterns. Key among these is the recognition of Account Statements. In addition to identifying patterns, the record generation subsystem 12 will have "financial statement" transaction data (Statement Data) parsed out of the CCS and stored separately. Statement data, which represents information on a collection of transactions associated with a single account will be recorded and associated with the file information captured on receipt. The record generation subsystem 12 will then convert this data to a CSV format or other preferred bulk transaction data format, prior to the processing of bulk transaction data.

Statement Data Extraction

Either from the initial character of the CCS or from any page break marker, one or more sequential page substring(s) must exist that manifests the following:

1. User Account Name and address string appear in the OCR text, in sequential lines, with the same count of spaces and characters to the first character of the User's Account Name and Address.

2. One or more complete credit card (cc) or bank account numbers that are associated with the User Account are present in the page substring.

2.1. A complete set of PCS associated with a transaction document with a supplier does not appear between the credit card or bank account details and sub strings complying with rules described below.

2.2. String does not contain "Tax Invoice"

2.3. String contains at least one of the PCS indicating the document is a statement such as "Statement", "Closing balance", "Transactions".

2.4. The name (and at least one other identifier—e.g. address of a financial institution associated with the account bank,) of the financial institution associated with the credit card, bank account or other account number appears in the substring.

3. A clear pattern exists:

3.1. multiple lines with same number of columns (e.g. strings divided by 3+ spaces w/equal number of strings and sequences of 3+ spaces)

3.2. The first field in each line, the first column, contains date formatted string 3.3. The last string in each line is a currency formatted number string (this can appear in the last or second to last columns)

3.4. A header row line exists, either as the first of sequential lines with the column pattern or, fie not more than 4 lines prior to the initial line manifesting the column pattern, that also manifests a column pattern and the string in the column which corresponds to the subsequent lines containing a date formatted string contains "Date" or other date header title, the column containing currency formatted amounts contains "amount", "Debit", "Credit", "deposit", or other appropriate header label. These header row labels are defined by their relative position (e.g. the Header Row PCS (HRPCS) is above the column with the corresponding data as defined by having the same count of spaces and characters to the HRPCS string center point (+ or −4 character spaces) from the beginning or end count for the currency formatted strings in subsequent lines, in the case of the Date information, the HRPCS should share either the first or last character count as the date formatted strings in the subsequent lines).

4. A statement may extend over multiple pages. A page break may be ignored if after a page break the column format identified above continues and the account number identified above appears and/or the dates are sequential or within a date range that appears within the sequential conforming page substrings (e.g. "from date to date" appears in the string, "Period" appears followed by two date formatted strings separated by spaces, hyphens, "to").

5. A statement may contain transactions for multiple accounts. If a line appears in between two lines that conform to the column format, check this line for an account number that complies with account number formats for the financial institution identified in step 1. Check that this second account number is associated with the User Account. If it is, treat the transactions that follow as a new statement for the second account number.

6. Statement always ends with a page break. If a "closing balance" PCS appears that is followed by a page break and the page substring that follows has a different midpoint, the column format is not continued, the statement data ends as the last character prior to the page break.

Patterns identified by the record generation subsystem 12 include:

1. Is either Midpoint A or Midpoint B the same for every line on the page?
2. How many different counts are there for the last character in each line for all lines in the page substring?
3. For lines with a currency formatted number, or "cr", "dr", "credit", "debit", "st", "tx st", "tx", "fs", "tl", "td", "cg" preceded by a currency formatted number, as the last character string in a line.
4. Is there a currency formatted amount in two or more sequential lines?
5. Is the count of characters and spaces to the currency formatted amounts in sequential lines the same for any position indicator (e.g. midpoint A, B, first character, last character)?
6. What is the count of characters and spaces to the final amount formatted string that appears in the page?

CSV or Preferred Data File/Bulk Transaction File Processing

There are a variety of pre-existing tools for managing data files, mapping data file content with various schemas to comply with the preferred schema and to insert discrete database entries per entry in the submitted bulk transaction data file. The record generation subsystem 12 will map fields from data files to their corresponding fields in the bookkeeping system's user specific transaction dataset. The record generation subsystem 12 will also insert or augmenting each transaction entry with the additional information described in Table 1 based on the source file, how it was received, etc.

Convert Statement Data to CSV (or Preferred Bulk Transaction Data Format)

Having extracted statement data from a CCS, the record generation subsystems 12 will create a data file for transaction information associated with each account number identified. Each line will contain the account number as well as the content of the line from the page substring. The line substring will have comma's inserted wherever there were 'gaps' of 3+ spaces and or where the system has determined there was an empty column (via comparison of sequential lines with two distinct column patterns). The header row identified in the statement will be inserted as the first row in the CSV file created.

Did the File Received Contain One or Many Transaction Documents & Parsing into Individual Transaction Strings After parsing out statement data, if there are any characters remaining in the CCS created for a received file, this will be analyzed by the record generation subsystem 12, at step 92, to determine if it represents a single transaction or multiple transactions. Where the remaining CCS represents more than one transaction document, the string will be broken down into discrete transaction strings.

In other words, the record generation subsystem 12 will act to analyse each complete character string to determine if document represents more than one transaction, and if so, will break the complete character string into individual transaction substrings each corresponding to a single financial transaction. The record generation subsystem 12 will then store transaction data, including the transaction character strings and associated transaction data strings, for each single financial transaction in the database bank 20 for performing subsequent accounting operations.

At step 94, the record generation subsystem 12 will once again act to carry out a PCS review and data augmentation by analysing each complete character string to identify known transaction character strings used in financial transactions, and analysing each complete character string to identify transaction data strings associated with each identified transaction character string.

Each individual transaction substring will accordingly be recorded by the record generation subsystem 12 in the database bank 20 and be associated with all information captured, extracted or augmented thus far.

At step 96, the CCS will be broken down by the record generation subsystem 12 into discrete transaction substrings as follows:

1. A transaction break UMC will be inserted in the CCS
1.1. Where Statement Data has been removed
1.2. Prior to and after any occurrence of a recognized User Account code
1.2.1. If only one User Account code is found in any CCS, augment or associate all transaction substrings with the User Account code found.
1.3. At any point where the optimal OCR text direction has changed by more than X % between two consecutive pages.
1.4. At any point where the average midpoint for all lines on a page changes by more than ZZ characters between two consecutive pages.
1.5. At the beginning and end of any page substring containing a complete set of Essential Preferred Character Strings (EPCS). (See Table 6 for EPCS).
1.6. Following any two page breaks (or following a transaction break followed by a page break), is there an incomplete set of EPCS following the first page or transaction break where all EPCS are different following the second page break and the average center point is different by X and the last character count is different by Y? Insert a transaction break for the page break in between the two sets of incomplete EPCS.
1.7. From any page or transaction break, Is there a complete set of unique EPCS ignoring sequential page breaks following the first page break but not ignoring any transaction breaks where at least one unique PCS is repeated in each page string (e.g. Invoice number) OR where the only character in the first line, or the only in the last line, or the top right or bottom right character string is a page number (preceded by "page" or "pg"/or just a single number string) where page numbers are sequential. If yes, Insert a transaction break for the page break in between the final complying and required page(s).
2. Between 1st line and 1st page break, is there one and only one complete set of EPCS? Between any transaction break and the next following page break, or between any page break and the next following page break is there 1 and only one complete set of EPCS? If yes, Insert a transaction break for the page break following the complete set of EPCS.

3. Are there multiple non-individually definitive PCS that determine two transactions but that combine to indicate two transaction documents such as:

3.1. "tax invoice" appears twice, once on each page and multiple different Dates formatted strings appear 3.2. Multiple "total" or "balance due" fields with different amounts 3.3. Multiple company names appear 3.4. Sum of 3rd to last amount in column plus 2nd to last amount equal last amount and amounts on next page are different, do sequences of currency amounts equal (e.g. line A+line B equals Line C, does this pattern repeat? Do Line C's sum to equal total?, XXXX If yes . . . Insert a transaction break between the two sets of PCS indicating different transactions.

4. Identify definitive document type PCS markers between two consecutive pages such as:

4.1. Two different BPay codes appear, one on one page and a different one on the next page 4.2. Two different ABNs appear.

Having inserted transaction markers throughout the remaining CCS, the record generation subsystem 12 parses the string into individual transactions substrings (being the first character to the first transaction marker, and then substrings between each transaction marker). Each transaction string is recorded in the database bank 20 and either augmented with or recorded such that it is associated with all other augmentation data generated thus far (e.g. Table 1, etc) and such that it is associated with the transaction string occurring in the document prior and that follows. In addition, each transaction string is recorded by the record generation subsystem 12 within or associated with each transaction substring if it was one of many extracted from a single file received and the total number of transactions found within the same file.

Verification of User Account

Where a user has purchased and is using the complete machine implementation 30 depicted in FIG. 2, all information processed by the stand alone complete machine will be assumed to be associated with a single user. The user's details will be configured when the machine is first activated and may be changed using manual intervention subsystem 18. This is also the case where the local installation 70 shown in FIG. 4 of the system 10 is being used.

In the SaaS configuration shown in FIG. 3, each user activating an account will be issued with a unique email address to which they can email digitized financial documents. Each machine sold utilizing an SaaS model will be configured to transmit digitized documents to the SaaS system using a unique email address.

In all cases, users will be provided a unique account number (this may correspond to the unique serial number given to the complete machine).

In any SaaS configuration, the record generation subsystem 12 will verify the user account where possible, at step 98. In summary, where a local installation or complete machine is not being used, the record generation subsystem 12 will determine:

1. Does the transaction string contain an user account code in the first line? Associated the transaction with that User Account.

2. Does the subject line of the email contain an user account code? Does this match the user account associated with the email address that received the email (and attached file)? Associate the transaction with that user account.

3. Is the email address that sent the email associated with the same user account as the email that received the attached file? Associate the transaction with that user account.

4. Does the file name of the file attached to the email contain an user account number or other identifier stored uniquely in association with a user account? Associate the transaction with that user account.

5. Does the Fax or Mobile # that sent the file match one associated with a user account? Associate the transaction with that user account.

6. Review the transaction substring for identifying PCS unique to the User Account such as customer reference numbers, credit card numbers or partial credit card numbers, supplier account numbers and other numbers unique to a User Supplier relationship. (Can be User Account name appearing in a Tax Invoice or standard Bill)—Is the unique PCS associated with a User Account?—Does the unique PCS User Account match the email User Account? Associate the transaction with that user account.

If none of the sending email address, fax number, or mobile number, nor the receiving email address are associated with a User Account and no user account number or unique PCS are contained within the file. The system will send a reply to the sending email, fax or mobile stating that the User Account is not recognized and the file should be resubmitted by a registered user.

Transaction Document Type

The record generation subsystem 12 will determine the type of document the transaction substring was generated from. Most common transaction documents can be identified by the presence of specific PCS and/or their size.

Each transaction string will be augmented by the record generation subsystem 12 with a document type based on the following:

A transaction substring that contains any of the following will be given the document type "Tax Invoice Standard Bill":

1. "Tax Invoice"

and

2. BPay

3. Biller Code

4. Does not contain "Reminder", "Late Notice" or variations

A transaction substring that contains any of the following will be given the document type "Tax Invoice Register Receipt":

1. "Tax Invoice"

and

2. Date and time are found in the transaction substring

3. "change" or equivalent cash register receipt only PCs are found

4. The midpoint is between 8 and 40 characters

And Does not contain

5. Standard Bill indicators

6. "Payment options"

7. "Payment Due"

A transaction substring that contains any of the following will be given the document type "Tax Invoice—Supplier Invoice":

1. "Tax Invoice"

and

2. IBAN

3. Swift

A transaction substring that contains any of the following will be given the document type "Register Receipt and Credit Card":
1. "Tax Invoice"
and
2. "Terminal ID" or variations (e.g. Term ID, Term) followed by an alphanumeric string
And
3. "Approved" or variation (Auth Number, Authorized) followed by an alphanumeric string
And
4. One or more of the following:
   a. "Total", "Pur", "Purchase" followed by an amount
   b. One or more "Visa", "MC", "Amex"
   c. Date and time
   d. "customer copy"
   e. Complying format credit card number or complying format partial credit card number (1st digit matches type of card, Visa 4, MC 5, Amex 3, etc) 3 numbers followed by "." or "x" or "*" followed by four digits or just four digits matching a credit card associated with the user account.

A transaction substring that contains any of the following will be given the document type "Credit Card Receipt":
1. Any two or more of the following:
   a. "Terminal ID" or variations (e.g. Term ID, Term) followed by an alphanumeric string
   b. "Approved" or variation (Auth Number, Authorized) followed by an alphanumeric string
   c. One or more of the following:
      i. "Total", "Pur", "Purchase" followed by an amount
      ii. "customer copy"
      iii. Complying format credit card number or complying format partial credit card number (1st digit matches type of card, Visa 4, MC 5, Amex 3, etc) 3 numbers followed by "." or "x" or "*" followed by four digits or just four digits matching a credit card associated with the user account.
2. Does not contain
   a. Tax invoice markers A transaction substring that contains any of the following will be given the document type "Register Receipt":
1. Does not contain Tax Invoice or Credit Card indicators
   a. And
2. Does contain
   a. Cash
   b. Change, "cg" where line prior less line before that equals number in the line with "cq", variations
   c. Rounding A transaction substring that contains any of the following will be given the document type "Check":
1. Cheque Number and variations Chq No, etc followed by a digit (verified by the digit sequence being repeated as first digit set of last line that is all digits)
2. "or bearer"
3. Not Negotiable
4. Occurrence of text strings corresponding to a single currency formatted string equaling the same amount
5. "For and on behalf of"
6. "Signature"

A transaction substring that contains any of the following will be given the document type "Deposit Slip":
1. "Deposit"
2. List a cheque number followed by a currency amount.
3. List more than one cheque number, followed by currency amounts and a total that is the sum of those amounts?

4. Have "Cash" or an uninterpretable string followed by a currency or followed by an uninterpretable string that contains digits?
5. If it contains (4) above, is the total higher than the sum of the interpretable amounts.

A transaction substring that contains any of the following will be given the document type "Non VAT/GST Cash Register Receipt":
1. It is not identified as another document type
And
2. It contains one and only one occurrence of "Total" (or variations) followed by a currency number string
OR
3. No line has a character length exceeding 80
4. If it has more than one "Total" or variation followed by a currency number, and all are equal
5. There is a clear column of currency formatted numbers (e.g. same count to last digit, last string in each line is a currency amount or last string in each line is "cr" "tx" or other common cash register receipt abbreviation preceded immediately by a currency amount)
6. The currency items add up to the final currency item
   a. If currency strings are the last in each line (other than "cr" "dr" "credit" "debit" "tx" etc) do they add up given one of the following formulas?
      i. $A + An-1 = An$
      ii. $A + An-3 = An-2$
      iii. $An-2 \times Z = An-1$ (where Z equals the applicable sales tax for the country or state—e.g. 0.1 for Aus, 0.17 for UK VAT, 0.07 for California state sales tax)
      iv. $An-2 + An-1 = An$
      v. In the last column, e.g. currency strings are the last character in a sequence of lines with the same count to the last character or the currency symbol that proceeds the last character . . . the above formulas apply (e.g. the final amount in the column and other numbers in the same column).
      vi. Variation on the above columns to consider a string in which the initial character string is commenced by "discount" or variation.
or
7. The third to last currency item plus the second to last currency item add up to the last currency item A transaction substring that contains any of the following will be given the document type "Other" by record generation subsystem 12 where it can not be identified as one of the above document types.

Essential Preferred Character Strings (EPCS) by Document Type

If between the very first character in a CSS and the first page break marker, or between any two page break markers, a complete set of EPCS is found corresponding to the following and no indicators of an additional transaction, transaction markers can be inserted at the beginning and end of that page as well as the document type established.

EPCS sets include the occurrence of one and only one of each of the following:

Document Type Tax Invoice—Supplier Invoice
1. "Tax Invoice"
2. ABN or variations along with complying number string.
3. "Total" or variations along with a complying number string in currency format #*.##)
4. Date
5. GST, GST Total, GST amount, or variations along with a complying number string in currency format (#*.##) or the occurrence of "GST inclusive" or GST exclusive and the ability to calculate GST
6. NO
a. BPay or Biller Code
b. Terminal ID or variation and Authorization or variation
Document Type Tax Invoice—Standard Bill
1. "Tax Invoice"
2. ABN or variations along with complying number string.
3. "Total" or variations along with a complying number string in currency format #*.##)
4. Date
5. GST, GST Total, GST amount, or variations along with a complying number string in currency format (#*.##) or the occurrence of "GST inclusive" or GST exclusive and the ability to calculate GST
6. BPay or Biller Code
7. NO Terminal ID or variation and Authorization or variation
Document Type Tax Invoice—Cash Register Receipt
1. "Tax Invoice"
2. ABN or variations along with complying number string.
3. "Total" or variations along with a complying number string in currency format #*.##)
4. Date
5. GST, GST Total, GST amount, or variations along with a complying number string in currency format (#*.##) or the occurrence of "GST inclusive" or GST exclusive and the ability to calculate GST
6. Terminal ID or variation and Authorization or variation
7. NO BPay or Biller Code
Document Type Check/Cheque
1. One and only one currency formatted amount
And any one or more of the following
2. "Not Negotiable"
3. "or bearer"
Other Party Identification Whenever a transaction string contains PCS for definitively determining the other party to the transaction, these will be used by the record generation subsystem 12 at step 100 to determine that other party. Where they appear but cannot be used to identify the other party, the transaction will be assigned by the record generation subsystem 12 to Miscellaneous supplier and referred for manual input. Where no information is available to determine the other party the transaction will be assigned by the record generation subsystem 12 to Miscellaneous supplier.

Key PCS for enabling the other party to be determined by the record generation subsystem 12 include:
1. ABN
2. Pty Ltd proceeded by one or more character strings that match a company name already in the user accounts data set of suppliers, that match a business name found in the ASIC database.
3. Character strings that match city or state names, Address stings, Street, Aus post look up of addresses
4. Phone numbers—Phone, Ph, "Call" followed by a space or followed by a ":" possible followed by "(0*)" and followed by one or more strings of digits totaling 8 (or 9 digits where there is no (0*) but the first digit is a 0 and there is a total of 9 digits and the first three digits following the 0 is a match to a mobile phone number prefix in the mobile phone number prefix data table) or followed by 1800 or 1300 and six other digits.
5. Fax numbers
6. Text strings containing 3 or more words in sequence that are exact matches to text strings found in other transactions (indicating a matching description or business name)

The detailed process involves by record generation subsystem 12 determining: Does the transaction contain Preferred Other Party Identification Character Strings (POPICS) such as ABN (other than that of the User account), Bpay Code or Biller code. If yes, does this code appear in a transaction already associated with a supplier in the Users Data set? Associate this transaction with the same supplier. If no, does this POP ICS code appear in any User account data set (as a User or as a Supplier), if so add this supplier to this Use Account data set of suppliers and associated this transaction with that supplier. If not, look up the POPICS in ASIC company search online database or the BPay online look up. In the case of ASIC ABN look up, is the ABN a valid ABN number. If not, report the transaction to subsystem 4 for manual input. If it is, extract the Business Name, trading name(s), previous name(s), ACN, Status, Locality of registered office suburb, state, post code. Does the ASIC business or trading name string appear in the transaction record? If yes, use this name and details for the supplier and associate this transaction record. If no, look up the ASIC extracted name in the white pages. Extract the address. Is the address found in the white pages result found in the transaction string. If yes, assign other party details based on ASIC look up. Assign alternate name as string that proceeds address in transaction.

Is there a supplier in the user account with an ABN that is only one digit difference? Does the name string of this supplier appear in the transaction string? In two or more/a majority of other user accounts transactions? Is there a supplier in the user account with an ABN that is only one digit difference? Does the name string of this supplier appear in the transaction string?

Are there one or more of the PCS associated uniquely with an Other Party in the transaction (1. phone number, 2. fax number, 3. string(s) preceding Pty Ltd or Ltd (only strings in the line preceding the company indicator, line immediately preceding an ABN)? In order of priority, look up all PCS associated uniquely with another party in Google Maps, Yellow Pages, and other public databases and record top 5 results. Does business name extracted from any of the top 5 results in the highest priority search appear in the transaction string? If yes, assign other party details based on details from matching highest ranked other party detail search result. If no, does the address extracted from the next highest priority search appear in the transaction string? If yes, assign other party details based on details from the matching search result.

Is there an identifiable Address (use Address Identification and Extraction). Is this a verified postal address (Google maps, postal database, etc). Look up next preceding substring that is not an ABN or phone number in google maps, yellow pages. Extract top 5 responses. Does business name extracted from any of the top 5 search results appear in the transaction string?

Is there an URL? Only one URL with the final extension corresponding to the country of origin for the user account? URL % match with string that proceeds address? String that proceeds address does it appear in the web site but not as URL? Does phone number in transaction match phone in web page?

Does the transaction contain 3 or more sequential character strings uniquely found in the description fields of one or more transactions associated only with a single supplier within the User Accounts data set? Assign appropriate Other Party Identifiers to transactions based on those associated with transactions already assigned Assign to supplier "Miscellaneous"

In order to achieve the foregoing, the record generation subsystem 12 acts to identify and extract address information by processing a first transaction document including one or financial transaction entries. As described previously, the record generation subsystem 12 is configured to a) receive or generate a complete character string characterising the financial transaction entries displayed on the document, b) analyse each complete character string to identify known transaction identifiers, c) analyse each complete character string to identify transaction data strings associated with each identified transaction character string, and d) store transaction data, including the transaction character strings and associated transaction data strings, for each single financial transaction in a database.

In addition though, the record generation subsystem 12 is configured to e) augment the transaction identifiers and transaction data strings by accessing previously stored transaction data and/or one or more external databases.

In one or more embodiments, the reconciliation subsystem 14 is configured to reconcile the stored transaction data from first transaction document with the stored transaction data from one or more other transaction documents, wherein the stored transaction data from one or more other transaction documents has been obtained for performing steps a) to d) on the one or more other transaction documents.

In one or more embodiments, the previously stored transaction data used in step e) includes the stored transaction data from the one or more other transaction documents.

Address Identification & Extraction

The record generation subsystem 12 acts to identify and extract address information by the following:

1. Identify any State PCS (e.g. Vic or Victoria, Qld or Queensland, Calif. or California, etc). Preceded by a space and followed by a space.
2. Is it followed by a number string that complies with the rules for a post code associated with that state? Or Is it preceded by a suburb/town that can be looked up on Google Maps in that state? Or both? Use this State, Suburb and postcode.
3. Is the Suburb, state and Postcode sequence preceded by or does it have in the line prior at the same count of characters from the left margin to the first character in a string which is preceded by a gap of 3 or more spaces or does it have a string with the same count to the string midpoint in the line prior a Street Name (one or more substrings followed by Street, Road, Rd, etc) and or a Street name preceded by a Number string where either the street name or street name and number is found/can be looked up in Google Maps in combination with any combination of the state, town and post code (noting that if a number string precedes a street name validated by google maps lookup the substring that precedes that and any additional number string should also be inserted into the Street address field if the preceding substring equals "Lvl" or "level" or Apt or Apartment, a number string). That street string including the Suburb, State and postcode is the address of the supplier.
4. If State and post code match as well as Two of three key address PCS (street number, street or suburb) use address look up of address in google maps.

Value Determination

The transaction value for each transaction is determined by the record generation subsystem 12, at step 102, based on the document type. Where the OCR and OCR correction module yield PCS which clearly define value, the determination is very straight forward. Where the transaction document format is complex and contains many currency amounts or where a clear PCS which determines the transaction value is not evident the following processes will substantially reduce or eliminate the requirement for manual involvement.

A basic process is applied to all document types. If this basic process does not yield definitive values, an extended process is used to determine required values based on those values that can be identified and interpreted.

Whenever the basic and extended processes do not determine key values for the transaction, the transaction document image, extracted data and required values will be referred to manual intervention subsystem 18 for manual review and input.

The basic analysis carried out by the record generation subsystem 12 is as follows:

1. Does the transaction substring contain at least one of each EPCS for that transaction document type along with associated data for those EPCS?
2. Does the transaction substring contain only one of each EPCS with its associated data? If yes, use those EPCS and associated values. Augment the transaction substring with or record associated with the substring and its associated data (e.g. file name, user account, etc) the EPCS and associated values as the values for the transaction.

If no, continue.

3. Has the Other Party been identified? If yes, review other transaction strings of the same doc type and from the same supplier. EPCS will appear in the same position (line number + or − one or two, count from left margin + or − one to 5 characters) for other transaction documents from the same supplier of the same doc type. If currency amounts appear in these positions, these amounts can be used as the values for EPCS.
4. Does the transaction string contain at least one "Total" or equivalent PCS variation and an associated value? If yes, If no;

5. Does the transaction string contain multiple "Total" or equivalent PCS variation? If yes, are the associated values all equal? If yes, use that value for the "Total".

If no?

6. Is the transaction a type to which GST, VAT, sales tax, etc applies?
   a. If yes, does the transaction string contain "GST Amount" or equivalent PCS variation and an associated amount? If yes, use that amount for GST (or market equivalent).
   b. If no, is Total the only value required?
   c. If yes, use that value and proceed.
   d. If no, proceed to extended process for that document type.
7. Use the extended process to determine either or both Total and GST (or equivalent) amounts for the transaction.

The extended analyses for some document types are described below.

Value Determination Tax Register Receipt & Supplier Tax Invoice

Two values are required for these document types. In the absence of a complete set of EPCS, three contingencies must be dealt with:

1. The "Total" is known but the GST (or equivalent tax) amount has not been verified.
2. The "GST" (or equivalent tax) amount has been determined but the total has not been verified.

3. Neither the Total or GST (or equivalent tax) amount have been verified.

In the first case where a value for "total" (or variation such as "To our charges", "Tender", etc) has been identified, the following steps will be undertaken:

1. Does a GST PCS (e.g."GST Total" or equivalent PCS) appear in the string.
   a. Does an alpha numeric string exist where if it were simply a numeric string it would comply with the rules for associated data for GST.
   b. Does $1/11^{th}$ of the total result in a currency string that matches the numerical characters of the substring identified above? If yes, use that value for GST. If no, does $1/10^{th}$ of the total?
   c. Any line containing "GST" which is within 5 lines of the Total and contains a currency value that is equal to or less than $1/10^{th}$ or $1/11^{th}$ of the "Total" value. Use that value for GST (VAT/sales tax as appropriate for country of User account. Type of tax label and % to very as appropriate).
2. Calculate $1/11^{th}$ of the total. Does a currency value appear in the string that is $1/11^{th}$ of the "total"? Does $1/11^{th}$ of the total result in a currency string that matches the numerical characters of another string found in the Transaction string and is within 5 lines of the Total value?
3. Is the Total value the largest value in the string? If no, does the sum of the Total Value and one other value in the string equal the largest value found in the string? Is that other value less than $1/11^{th}$ of the total? If yes, use that value.
4. Does "GST Exclusive" or equivalent appear in the transaction string? If yes, apply the above using $1/10^{th}$ in lieu of $1/11^{th}$.

Where the GST amount has been identified but a "Total" has not:

1. Is the largest value in the transaction string equal to 11 times the GST value?
2. Is the largest value in the transaction string equal to 10 times the GST value?
3. Is there an alpha numeric string where the number characters correspond or match the numbers and positions of 11 times the GST value? Of 10 times the GST value?
4. Is there a "subtotal" PCS or equivalent and associated value (if multiple, are all the associated values equal)? If yes, does the sum of the subtotal value and the gst value result in an amount:
   a. Equal to the largest value in the transactions substring? Use that amount for the total.
   b. Where the number characters correspond or match the numbers and positions in an alphanumeric substring that occurs in the lines that follow and where the matching numbers in matching positions represent a majority of the characters in the substring (e.g. 2 or 3, 3 of 4, 3 of 5, etc)?
5. Is Document Type a Cash Register Receipt? Are any of the following formulas true (In the last column, e.g. currency strings are the last character in a sequence of lines with the same count to the last character or the currency symbol that proceeds the last character . . . the above formulas apply (e.g. the final amount in the column and other numbers in the same column) including where multiple lines end in either a currency amount or "cr" "dr" "tx" or other single or double character immediately preceded by a currency amount)?

(Sum A1:An−4)=An−3
(Sum A1:An−1)=An
(An−2)×$1/10^{th}$=An−1
(An−1)×$1/10^{th}$=An
An−2+An−1=An
Sum A1:An−1=An use as the Total=An 6. Variation on the above columns
   every X lines sum to total (e.g. A3, A7, A11, An4=total or subtotal or A2, A4, A6, An2=total, subtotal, the largest value or the second largest value where that value summed with An−1 equals the largest value)
   a series of entries where there subtotals equals the total, subtotal, second largest value, largest value. Such as (A1−A2)+(A3−A4)+(Anx−Anx+1)=total, subtotal, etc.
7. Variation on the above columns and summations to consider a string in which the initial character string is commenced by "discount".

Where neither GST or Total are verified:
An=final line with a currency formatted amount
Where An=(An−2)+(An−1) then Total equals An Line An−1 contains a string containing 3 characters with any one of or combination of the first character being "g", the second character being "s" or the third character being "t"—and An−1 is less than or equal to $1/11^{th}$ of An−2, GST equals An−1 (An−2)×$1/10^{th}$=An−1

A currency amount that does not precede the largest amount by more than 2 lines or that follows the largest amount is equal to $1/10^{th}$ or $1/11^{th}$ of the largest amount. Where the amount is equal to $1/10^{th}$, the total is the largest amount summed with the $1/10^{th}$ amount. Where the amount is $1/11^{th}$, the total is the largest amount and GST is the $1/11^{th}$ amount.

In markets other than Australia, these calculations would simply be amended to reflect the local VAT or sales tax percentage for the user's country or state.

Is there a column format? Is the head of one of those columns "GST". Are the non-header row values in currency format? Are those with non-zero values equal to $1/10^{th}$ of another currency value in their respective lines? If so, is the value in the line with the highest line number for that column, the highest value in the column?

(Column—same count to the last character of a currency formatted number string in multiple sequential or sequential stepped lines, with a preceding line having a PCS header value with its mid point above the values in that column.)

Did the extended process yield a definitive amount for Total and GST? If yes, the record generation subsystem 12 proceeds to determine the transaction general ledger type. If no, both the record generation subsystem 12 passes the transaction string to determine the transaction general ledger type to determine the other party if possible and refer transaction document and information to the manual intervention subsystem 18 for manual input.

Value Determination Standard Bill Tax Invoice

The record generation subsystem 12 also acts, at step 102, to determine:

1. In a line a series of currency amounts appear where the first summed with the second equals the third, the third summed with the fourth equals the fifth. Where in the line prior in with the same counts, one or more PCS are identified as "Last Bill", "Payment", "Adjustments", "Balance", "This Bill", "Total Amount Due". Where the final figure less a "Balance" figure equals an amount also shown.

Value Determination Credit Card and Combined Credit Card and Register Receipt

The record generation subsystem 12 then repeats a similar process, but with additional or different elements in the Extended Process:

Amount Verification—Credit Card Receipt Only

"Purchase" or variations (e.g. "Pur") followed by currency formatted amount. This amount is the "Total".

"Total" or variations followed by a currency formatted amount and preceding by no more than 3 lines "Approved" or variation.

One or multiple "Total" and one or multiple "Purchase" or variation where the currency amounts that follow each are equal. This is the total amount.

"EFTPOS" followed by a currency value. Where no "Total" or "Purchase" or variation is present. Use the currency amount that followed EFTPOS.

Where no "Total" or "Purchase" or variation is present, and where "Subtotal:" is the highest currency value present. Use "Subtotal" value as the "Total".

Combined Credit Card and Cash Register Receipt

Total for credit card receipt value and cash register receipt value:

1. Total equals the currency values are associated with any two of the following PCS and they are both equal:
   "EFTPOS"
   "Total"
   "Purchase" or variation.
   "Subtotal"
   "Tender"

Use 1.3.A.i and 1.3.A.ii. to determine GST amount.

Value Determination Cheque/Check

Is there only once currency formatted string (preceded by a $ symbol, any number of spaces or wild card symbols between the dollar sign and the currency formatted number). If yes, that is the check value.

Convert word/alpha strings that are words of numbers to numbers. Does the resultant number match a currency formatted string? (Note, off the shelf systems are available for converting written numbers to numerical digit sequences. If required, sum the numbers created from converting words to numbers—excluding any word number occurring after the word "dollars" (or local currency label) or if "dollars" (or local currency label) does not appear, excluding the word immediately preceding the word "cents"—to create a single currency amount in whole dollars). If the word "cents" appears, if "no" or "zero" occurs immediately preceding 'cents" then use the number generated from summing as the whole dollar amount and zero cents. Otherwise use the digits created by converting the word numbers immediately preceding Cents and/or after Dollars.

Whole dollar amounts should always appear before the word "dollar" (or local currency name).

Value Determination Cash Register Receipt (Not GST, VAT Applicable)

The record generation subsystem 12 then repeats a similar process, but with different Extended Process. Noting that GST or equivalent value added tax is equal to zero.

1. "Total" or variations appears only once and is followed by a currency formatted amount, us that amount.
2. "Purchase" or variations (e.g. "Pur") appears only once and is followed by currency formatted amount. Total is that amount.
3. One or multiple "Total" and one or multiple "Purchase" or variation where the currency amounts that follow each are equal. Use that matching amount.
4. "EFTPOS" followed by a currency value. Where no "Total" or "Purchase" or variation is equal. Total equals the currency value that followed EFTPOS.
5. Where no "Total" or "Purchase" or variation is present, and where "Subtotal:" is the highest currency value present. Use "Subtotal" value.
6. "Tendered" amount or Highest amount less "change" amount equals next highest amount. Use next highest amount as Total.
7. If currency strings are the last in each line (other than "cr" "dr" "credit" "debit" "tx" etc) do they add up given one of the following formulas? If so, Total equals An.
   (Sum A1:An−4)=An−3
   (Sum A1:An−1)=An
   (An−2)×$\frac{1}{10}^{th}$=An−1
   (An−1)×$\frac{1}{10}^{th}$=An
   An−2+An−1=An If no definitive value is identified by the record generation subsystem 12, it is referred to the manual intervention subsystem for manual input.

Value Determination Deposit Slips

The record generation subsystem 12 then repeats a similar process, but with a different Extended Process 1. Is the last currency amount that appears the largest value. If yes, total equals the largest value.
2. Does the Sum of A1 to An−1=An (An being the final currency value). If so, total equals An.
3. Deposit slips may include checks and cash. In which case:
   a. Sum A1 to An−x=A((n−x)+1) (A((n−x)+1) equals the cheque or cash total). A1 is the first line, An is the final line, An−x is any line in between. A((n−x)+1) is the line that follows An−x. This formula would identify a subtotal of checks or cash in a deposit slip. (E.g. does the first value plus the second equal the third? No— does the $1^{st}$, $2^{nd}$ and $3^{rd}$ sum to equal the $4^{th}$ and so on. Where true, is there a number after A((n−x)+1) (e.g. the first subtotal))? If this formula is true, Is there only one currency amount after? Only two currency amounts after? More than two?
   b. If only one currency amount follows, is An−x=An, if so use An if not present for manual review.
   c. If only two currency amounts follow A((n−x)+1), does Sum (A1:An−2)+An−1=An, if so use An, if not present for manual review.
   d. If more than two currency amounts follow, does:
      i. A((n−x)+2) (e.g. the number after the first subtotal)+ A((n−x)+3)=A((n−x)+4) or
      ii. A((n−x)+2) (e.g. the number after the first subtotal)+ A((n−x)+3)+A((n−x)+4)=A((n−x)+5)
      iii. And so on.
      iv. If so, does A((n−x)+1)+A((n−x)+y)=An (e.g. do the two subtotals equal the final currency amount shown). If so, An=total.

Value Determination Other

The record generation subsystem 12 then repeats a similar process, but with different Extended Process 1. Is there one and only one currency amount in the document?
2. Are there more than one currency amounts in the document? Do they all match? Use that amount as the total.
3. Do all currency amounts except one add up to the one remaining? Use that amount.

Value Determination Payslips, Group Certificates, W2

For Group Certificates, Payslips, W2 forms or other country or market specific equivalents, values are only determined by the record generation subsystem 12 by an exact match to related PCS. PCS are identified below. Rules for associated data to payslip PCS are defined on a country specific basis. PCS include:
   "Net pay"
   "Total pay"
   "Gross pay"
   "Gross Salary"

"Withholding"
"Net withholding"
"Annual Salary"
"Base salary"
"Hourly rate"
1. Date strings—the first occurrence of a date string, occurrence of a date string in close proximity to a time string
2. Late Notice
3. Cheque received
   a. Cheque, chq, cheque no. cheque #, chq no. chq #, bank cheque, bank check, check
   b. Vendor no:
   c. Vendor reference
   d. Gross amount
   e. Net amount
   f. Pay, the sum of, or bearer
4. Manual written invoices received
5. Deposit, deposit slip
6. Remittance advice
7. Previous assignment or association of transactions and the text strings associated with those transactions (percentage of character sequences in one transaction that match sequences in another transaction, excluding frequently occurring character strings such as GST, Total, etc).

Transaction Type Determination (Transaction Category or GL Type)

At step 104, the record generation subsystem 12 determines:
1. Is it credit or debit? (Statement transaction can be either and their nature is determined by their header row. All other are determined by the transaction document type. Cheques, Deposits, EFT receipts, and User Account generated invoices are credits. All others are debits.
2. If a credit, can the payer be determined?
3. If a debit, is the other party known (via 1.2.J)
If yes,
   a. Are there already transactions in the User's account associated with that other party? If yes, do they all have the same GL code? If yes, use that GL code. If no; is there any sequence of substrings within the transaction string that corresponds exactly to the description of one or more previously assigned transactions? If yes, do these matching transactions all use the same GL code? If yes, use that GL code. If no, assign the GL code most used for transactions associated with this supplier and refer to manual intervention subsystem 18 as a transaction that MAY require manual input.
   b. If no transactions are already associated with this supplier in the User's accounts, is the subcategory of business of that other party known? If yes, look up the associated GL code for transactions between suppliers of that subcategory and businesses of the subcategory of the User Account. If no;
   c. Is the category of business of that other party known? If yes, look up the associated GL code for transactions between suppliers of that category and businesses of the subcategory of the User Account. If no;
   d. If the neither the subcategory or category of the other business is known, does that other party exist in other user accounts of the same subcategory of the User? Do a majority of these use a particular GL code for that supplier? If yes, use that GL code.

If no, does that other party exist in other user accounts of the same category of the User? Do a majority of these use a particular GL code for that supplier? If yes, use that GL code.

If no, do any sequence of strings within the transaction string match strings within the description of other transactions in the user account (strings that appear in the products and services look up dataset or that are common appearances in the User account transaction description or in other Users transaction descriptions)? If they do, use the GL code associated with these existing transactions with matching descriptions or with the majority of transactions of the same product or service type. If not, do transaction descriptions in other User accounts of the same subcategory or category of the User account contain matching transactions. If yes, do a majority use the same GL code. If yes, use this.

If no, look up the Supplier in the yellow pages. Extract the category in which the business appears (or other equivalent publicly accessible online database). Assign this as the business category for that supplier. Repeat the above step to assign a GL code based on the business category of the supplier for that User Account business category.

If a business category cannot be extracted from an online search, assign the transaction to Miscellaneous expenses with General Overheads and submit to subsystem 4 as a transaction that MAY require manual input.

It will be appreciated from the foregoing that the record generation subsystem 12 is configured to categorize the previously referred to transaction identifiers and transaction data strings by carrying out a categorization process including sequence of categorization decisions and actions which involve comparison of the transaction identifiers and transaction data strings to previously stored transaction data and/or one or more external databases.

Matching and Reconciliation Subsystem

Once all paper transaction documents have been converted to transaction entries by the record generation subsystem 12, additional bookkeeping functions can be undertaken by the system 10. Where there are both credit card receipts and other receipts for transactions that may have been paid for using a credit card, the reconciliation subsystem 14 of the system 10 will automatically identify definite and likely matches of the two transaction documents.

Where statement data has been input into the system 10 (either as paper transaction documents) or via bulk transaction file submission or upload, the reconciliation subsystem 14 will identify definite and likely matches of paper transaction documents to transactions appearing in statements. Finally, where an accounting software system data set is available, both statement transactions and paper transactions will be used to find definite and likely matches to existing transaction entries and/or to either update or make available information with which the accounting system can be updated.

For all types of users, credit card reconciliation steps will occur first:

Paper Credit Card Receipts to other Paper Transaction Documents
Paper Credit Card Receipts to Credit Card Statement
Paper Transaction Documents to Credit Card Statement
Credit Card Total Payment to Bank Statement The identification of matches for credit card related transactions is as follows:

Paper Credit Card Receipts to Other Paper Transaction Documents

The reconciliation subsystem 14 determines:
1. Is there an exact match of amount?
2. Is there an exact match of dates?
3. Is the time on the credit card receipt an exact match to the time on the other transaction document?
4. Is the other party an exact match?

5. Is the other party on the credit card receipt associated with the other party in the other receipt document string?
6. Does the credit card number or partial credit card number match?
7. Excluding the name of the credit card company (e.g. visa, amex), excluding the name of processing financial institutions (e.g. bank names that appear on credit card receipts such as Commonwealth Bank, HSBC, etc) and excluding PCS associated with credit card receipts (such as "Terminal", "Customer Copy", "Approved", "EFTPOS", etc) does any sequence of substrings within the credit card receipt transaction string match substring within the transaction string for the other document.

If the reconciliation subsystem 14 determines that the response to 1, 2 is yes, and one or more of 4 through 7, the transactions are a match. If not, then the reconciliation subsystem 14 determines:

8. Are 1, 3 and one or more of 4 through 7 matches and is the date in the statement not later than 30 days from the date on the credit card receipt.
9. If 2, 3 and one or more of 4 through 7 are a match is the business category of the other party "hospitality"? If yes, is the total in the statement transaction record not more than 25% higher than the amount on the credit card receipt.

Paper Credit Card Receipts to Credit Card Statement

The reconciliation subsystem 14 determines:
1. Is there an exact match of amount.
2. Is there an exact match of dates.
3. Is the other party an exact match.
4. Excluding the name of the credit card company (e.g. visa, amex), excluding the name of processing financial institutions (e.g. bank names that appear on credit card receipts such as Commonwealth Bank, HSBC, etc) and excluding PCS associated with credit card receipts (such as "Terminal", "Customer Copy", "Approved", etc) does any sequence of substrings within the credit card receipt transaction string match substring within the statement transaction string.
5. Is the other party on the credit card receipt associated with the other party in the other receipt document string?

If yes to 1, 2 and 3 or 1, 2 and 4 or all four, the transactions are a match. If not:

6. Are 1, 3 and 4 matches and is the date in the statement not later than 30 days from the date on the credit card receipt.
7. If 2, 3 and 4 are a match is the business category of the other party "hospitality"? If yes, is the total in the statement transaction record not more than 25% higher than the amount on the credit card receipt.

Paper Transaction Documents to Credit Card Statement

The reconciliation subsystem 14 determines:
1. Is there an exact match of amount.
2. Is there an exact match of dates.
3. Does the credit card number or partial credit card number appear in the other document transaction string?
4. Is the other party an exact match.
5. Is the other party of the transaction document associated with the other party in the statement transaction string?

If yes to 1, 2 and 3, 4 or 5, the transactions are a match. If not:

6. Are 1, 3 and 4 or 5 matches and is the date in the statement not later than 30 days from the date of the other transaction.
7. If 2, 3 and 4 or 5 are a match is the business category of the other party "hospitality"? If yes, is the total in the statement transaction record not more than 25% higher than the amount on the credit card receipt.

Credit Card Total Payment to Bank Statement

The reconciliation subsystem 14 determines:

Does the credit card statement show a credit? On the same date or not more than 5 days prior, does a User Account bank statement transaction show a debit of the same amount? Is this the only transaction of this exact amount between the date of the credit transaction in the credit card statement and five days prior in the bank statement? If yes, match these transactions. If no, does the transaction string for the debit in the bank account statement data contain any substrings that confirm the payment was to the credit card account (e.g. automatic payment, payment by authority, credit card, a partial account number, etc.). If yes, match these transactions.

For Trust and Business Users, in addition to undertaking credit card reconciliations as described above first, the sequence of subsequently matching and reconciliation of debits carried out by the reconciliation subsystem 14 will be:

2.2. Paper Transaction Documents to Accounting Software data/transaction file followed by:
2.4. Account statement transactions (e.g. bank, credit card account, etc) to accounting software system.

Paper Transaction Documents to Accounting Software Data/Transactions

The reconciliation subsystem 14 determines:

Is the paper transaction document already recorded in the accounting software file? If not, update the accounting software. Paper transactions will require double entry depending on type and a determination of if they paper transaction is a bill or invoice yet to be paid or a cash transaction already paid. All tax invoices other than cash register receipts so including supplier invoices, standard bills will go in as payable. All cash register receipts will go in as already paid and either assigned to a confirmed credit card account or to cash within the accounting system chart of accounts.

Account Statement Transactions (e.g. Bank, Credit Card Account, Etc) to Accounting Software System Bank statement transactions will then be matched to the updated accounting software record.

1. Is there an exact match of amount.
2. Is the other party an exact match.
3. Is the other party of the transaction document associated with the other party in the statement transaction string?
4. Is there a unique reference number that matches the statement transaction to the transaction in the accounting software or with a supplier who is in the accounting software.
5. Is the amount unique amongst all outstanding amounts not reconciled within the accounting software file of transactions.

If the reconciliation subsystem determines that the answer to 1 and 2 or 3, 4 or 5 is yes, then the transactions are a match.

The reconciliation subsystem 14 performs that following actions for Credit or Money's Received Reconciliation:

EFT Confirmations to Bank Account Credits.
1. Is there an exact match of amount.
2. Is the other party an exact match.

3. Is the other party of the transaction document associated with the other party in the statement transaction string?
4. Is there a unique reference number that matches the statement transaction to the EFT confirmation document?
5. Is there a unique reference number that matches the EFT receipt to a user generated invoice record in the accounting software or with a customer who is in the accounting software.
6. Is the EFT amount unique amongst all outstanding amounts not reconciled within the bank account statement transactions.

Checks and Deposit Slips Reconciliation
Cheques to customer payments/user generated invoices
  Is there an exact and unique match of the check amount to the user generated invoice amount?
  Does the cheque transaction string contain the name of the customer?
  Does the cheque transaction string contain a name associated with the customer?
  Does the cheque transaction string contain a substring that is an exact match to the user generated invoice number or customer number?
  Note: cheques received matched to user generated invoices are assigned to a suspense account associated with that customer. Once the deposit amount appears in the bank transaction statement that the cheque was part of, the deposit amount will be offset against associated suspense account amounts and the amount 'credited' to the user generated invoice amount.

Cheques to Deposit Slips
  Is there an exact and unique match of the check amount to a currency amount on a deposit slip (in a deposit slip transaction string).
  Is the check number that appears in the deposit slip string an exact match to the check number.

Deposit Slips to Deposits in account statements
  Is there an exact and unique match of amount.
  Is there an exact match of amount and is the date a match.

Deposits or Credits in Account Statements to User Issued Invoices (as Paper Transactions or as Identified in an Accounting System File).
  Is the amount a unique match?
  EFT confirmation associated with customer. Invoice associated with customer. EFT date matches or is within 3 days of credit in account date.

Unmatched Deposits or Credits
  Unmatched deposits and accounts are assigned to miscellaneous revenue and submitted to the reconciliation subsystem 16 for manual review unless cash or credit card company deposits and category of user is hospitality or other category where assignment is directly to GL for revenue and no manual confirmation is required).

Accounting system containing User account generated invoices matched to statement credits/then to accounting software User account generated invoices or to User Account Generated Invoices (if converted from Paper rather than made available via accounting system data file)
  Match to Credits in banks statement transaction data—
  Bank statement transaction data contains string associated with customer record:
    invoice number
    client or customer number
    amount is unique match
    EFT receipt has been received showing data and amount
    Text string matches previous text string from payment made by same customer and is unique
    Credit amount equals some combination of outstanding invoice values Unmatched Items Report
Miscellaneous Assignment Report
Directly Update Accounting System Files or Generate Data File and Report of Update Entries.
Personal Expense Report
The Report is limited to:
  1. Paper to Credit Card receipt
  2. Credit card receipt to credit card statement
  3. Paper to credit card statement
  4. Report generation including:
  a. Receipts not found in credit card statement
  b. Credit card statement transactions in chronological order with additional columns showing matching credit card receipt found, matching transaction receipt found, no matching document found.
  c. All transactions associated with a credit card receipt, by credit card number where no statement data is available.
  d. All transactions not associated with a credit card receipt.
  e. By type. By type and date. By type and value.

Personal Use (no accounting software—reconcile bank statements, credit card statements, etc). Categorize expenses by tax deductibility as well as general categories (e.g. education, Medical, office supplies, subscriptions, donations, etc).

A Sample Transaction Document Processed Through the Reconciliation Subsystem 16
  1. The reconciliation subsystem 14 analyzes the transaction string and the fact that its origin is of the class "paper OCR'd". The reconciliation subsystem 14 will look for component sequences of characters within the string such as (though not limited to) "Tax Invoice", "A.B.N." followed by 11 digits, and "Total" followed by an amount (a currency symbol followed by one or more digits, followed by a "." and further followed by two and only two additional digits appearing). It will look for date and time stamp information by identifying component sequences of the string that match common date formats. The reconciliation subsystem 14 will enter identified components into a database of transactions with appropriate corresponding fields and associate with it the scanned image.
  2. For transaction strings where an Australian Business Number has been identified, the reconciliation subsystem 14 will then take the identified ABN number that appears and perform a look up to see if it is a match to the client/user's ABN number (entered when the user system account was originally set up), if only one ABN appears and this ABN is not a match to the client/user's, the reconciliation subsystem 14 will know the transaction represented by the string is an invoice to be paid or that has been paid by the client user and assign it accordingly to an expense account. Further, reconciliation subsystem 14 will assign the transaction to a sub account with the chart of accounts specific to that ABN or a supplier name matching that associated to that ABN (ABN doesn't exist in the User Account, then complete the other party identification process and augment the record and User account supplier data set accordingly).
  3. The reconciliation subsystem 14 will compare character strings of the transaction to character strings of previously assigned transactions to determine the probability of the transaction being associated with the same supplier or customer in the case of a user generated invoice (e.g. the same sub account within the chart of accounts).
4. The reconciliation subsystem 14 will also look for other associated transactions (e.g. review transactions identified as payments) that have been input into the system to identify if there is an exact match for date, date and time, amount and any descriptive sequences of characters in the string. Having identified the transaction as a purchase, the system will look at all available data sources of a payment category (e.g. transaction data obtained from a credit card or financial institution). An exact match will be considered to have been made in several situations. Examples of an exact include (but are not limited to):
  a. where the amount, date, time and description strings are an exact match
  b. where the amount, date and associated sub account name is a match for the description string in the payment transaction string
5. Where an account or sub account or related transaction is identified, the transactions string will be augmented in a specific way to include this information. The reconciliation subsystem 14 may create additional data strings to represent the required data strings associated with transactions in a double entry system.
6. The reconciliation subsystem 14 may use a double entry style method, but this is not required. In a situation where this is the case, the reconciliation subsystem 14 will take the above transaction, having identified it as a payment, and assign it to an expense account prior to looking for an additional match within possible payment transactions.
7. Where the double entry method has been adopted, the reconciliation subsystem 14 will then credit the general expense account on identification of the transaction string as an expense. It will debit the general expense account and credit a specific sub account on identification of the fact that there is a single ABN number in the transaction and that it is not the ABN of the client/user.
8. On the identification of a matching payment transaction, the reconciliation subsystem 14 will debit the sub account to which the expense has been assigned and credit of account or sub account to which the payment transaction string had been previously assigned.

Another example would be:
9. The reconciliation subsystem 14 will look at each line of data received from a data feed from a bank or financial institution, knowing that this is the source it can automatically assign all debits from the account to an expense heading and all credits to an income account.
10. As described above, the reconciliation subsystem 14 will look for appropriate matches to faxed, scanned or other transaction information that has been input to the system. Using date, amount and information appearing in the description field as described above to match payments or income received to bills, receipts faxed in and OCR'd or to invoices issued by the user from their existing book keeping software package.

The reconciliation subsystem 14 considers the following fields of information when determining a match:

8. Data source
  a. Electronic transmission of a paper record (fax, scanned and emailed, iphone photograph and MMS'd, etc)
  b. Manual entry
  c. Bulk import of transactions by user
  d. Data feed from financial institution
  e. Data feed from a payment gateway
  f. Data feed from or file import from an accounting or bookkeeping software system
  g. Data feed from a POS or other computerized system No existing systems currently automatically assign transactions to revenue or expense—or to a more detailed sub account within the chart of accounts such as a specific biller, payee, invoices, etc on receipt of that transaction without the described manual processes (of assigning it while data entering it or its placement in a suspense account) or the limitations described above for networked systems, predefined codes, etc.

No existing systems review all available data or character stings associated with a transaction and automating the use of this data to assign and associate transactions automatically. All require some form of intervention as described above (both sides to specify a unique code, manual matching and assignment of each transaction or of the initial transaction and manual creation of a rule at that time by the user, etc). This above-described system 10 eliminates or minimises the need for the user or programmer to define user specific rules or manually define for each transaction where it should be debited or credited within the financial or bookkeeping system. The system 10 will simply look at transaction data strings received from any source (bank feed, etc), assess the source and the data string and assign credits or debits to an established revenue or expense code. This information can then be made available in a variety ways back into an accounting software package, the user, etc.

The system 10 automatically assigns each transaction to an appropriate category or subcategory of revenue or expense as well as making direct matches to associated transactional data obtained from an accounting, book keeping, invoicing systems, point of sale or other financial system, based on the information available and without requiring an exact reference number to be entered by the payee and payor in order to facilitate the match.

Reporting Subsystem

For any user requested period and in an automated fashion on monthly, quarterly, annual basis, the following reports will be generated by the reporting subsystem 16 of the automated accounting system 10:

Profit and Loss (listing totals of all expenditures by type and all revenue or credits by type) and showing a net remainder Expenses by Category, Subcategory, Supplier, GL Code, Value or amount, Salaries and reimbursements (payments to non-companies)

Transactions by type, by customer (income)

In addition, a Business Activity Statement or Tax reporting by country will be generated by the reporting subsystem 16 to match market requirement. In Australia this is simply the total of GST paid over all transactions in the period, a total of GST charged that appears in user generated invoices. This report will be automatically generated. Where the user has made available appropriate access codes for electronic filing, the user will have an option to select for these details to be automatically submitted electronically. Further, the user will have the option to select cash or accrual reporting.

PPS—Where the user has made available appropriate access codes for electronic filing, the user will have an option provided by the reporting subsystem 16 to select for the PPS registration to be completed online for all user generated invoices above a certain amount or containing defined key words in their transaction string or both.

Overdue payment/Aged Receivables chasing and notifications—The reporting subsystem 16 enables a user to select via what mediums they would like overdue notices sent as well as select from default text for these reminder notices. Overdue payment reminders will then be automatically by the system to all customers for which the system has the appropriate corresponding email address, mobile number, postal address and who's invoices are shown as outstanding (no credit in a bank account statement found to match) beyond a specified number of days. 4 unique notifications can be configured to be sent via each medium to go out at each of three specified dates after the date of the user generated invoice. The fourth will also go out on a specified number of days after the user generated invoice. It may go out once or be configured to continue to be sent at a regular interval. The system will send overdue notices via:

Email
Post
SMS
MMS
Other

In the case of Post, the by the reporting subsystem 16 will generate a file to be printed and corresponding values and email this to a designated mail fulfillment house or the client for printing and posting.

Manual Intervention Subsystem

The manual intervention subsystem 18 provides the following functions:

1. Web interface for
    a. Account Set Up
    b. Logging in
    c. Uploading of a image or data files (e.g. csv, excel, etc)
        i. Identifier given to all data received based on name of file uploaded, user who has uploaded (based on account associated with login/password of individual who is uploading), source (e.g. web upload), time and date
        ii. Data files translated into standard format and transaction data input into transaction data base
    d. Accessing functionality
2. Screen presentations and User Experience
3. External web site
4. Screens for addressing
    a. exception reports/Manual input required transaction document images
    b. unmatched transactions
5. Screen for reviewing all matches and making manual changes if desired In addition, the manual intervention subsystem 18 enables the establishment of a user account which stores at least the User Account Information set out in Table 9 below in the database bank 20 for each user:

TABLE 9

| Stage | User Account Information |
|---|---|
| At set up | User Account Name (business name, trust name, expense report users name) |
| At set up | Associated trading name(s) and/or other names to which invoices are addressed from suppliers if appropriate |
| At set up | ABN |
| At set up - Auto look up | Registered Business Name associated with ABN |
| At set up | Phone |
| At set up | Mobile phone numbers that might MMS a transaction document image |
| At set up | fax #s that may be used to send in receipts |
| At set up | Email addresses (associated with the business that might be the sender of a book keeping related file) |
| At set up | Street Address |
| At set up | Postal Address |
| At set up | Primary Users Name |
| At set up | User Account Type selection (e.g. personal, trust, expense report, business) |
| At set up | country where receipts and invoices will predominantly be received from or in which obtained. |
| At Set up | Unique Login & Password for use in accessing the account, system, reports, etc. |
| At set up - Assigned | a unique email address to which the user should send emails with receipts attached |
| At set up - Assigned | an FTP folder for the above purpose |
| At set up - Assigned | a unique account number |
| At set up - Auto look up | ASIC registered office address |
| At set up - Auto look up | Business Category and Subcategory Google Look up |
| At set up - Auto look up | Business Category and Subcategory Yellow pages Look up |
| Set up stage 2 | Bank account number(s) associated with the account |
| Set up stage 2 | Credit card number(s) associated with the user account |
| Set up stage 2 | Business Category and Subcategory selected by User |
| Set up stage 2 | DDA/CCA or payment method |
| Set up Stage 3 | Secondary Users Name |
| Set up Stage 3 | Tertiary Users Name |
| Set up Stage 3 | Employee Names, TFNs, name on payroll that will appear in bank transactions |
| Set up Stage 3 | Bank link access information/ |
| Set up Stage 3 | Selection of 3rd Party Accounting software used |

TABLE 9-continued

| Stage | User Account Information |
|---|---|
| Set up Stage 3 | Associated expense report user accounts |
| Set up Stage 4 | Unique GL code assignment rules for this account |
| Through Use | Known suppliers |
| Through Use | Known customers |
| Through Use | Transactions requiring manual review |
| Through Use | Transactions by bank/cc account |
| Through Use | Income transactions |
| Through Use | Expense transactions |
| Through Use | Unique customer reference numbers or codes |
| Through Use | reoccuring account transactions |

The database bank 20 maintains at least the datasets indicated in Table 10 below:

TABLE 10

Data sets/databases required

Figure 5:
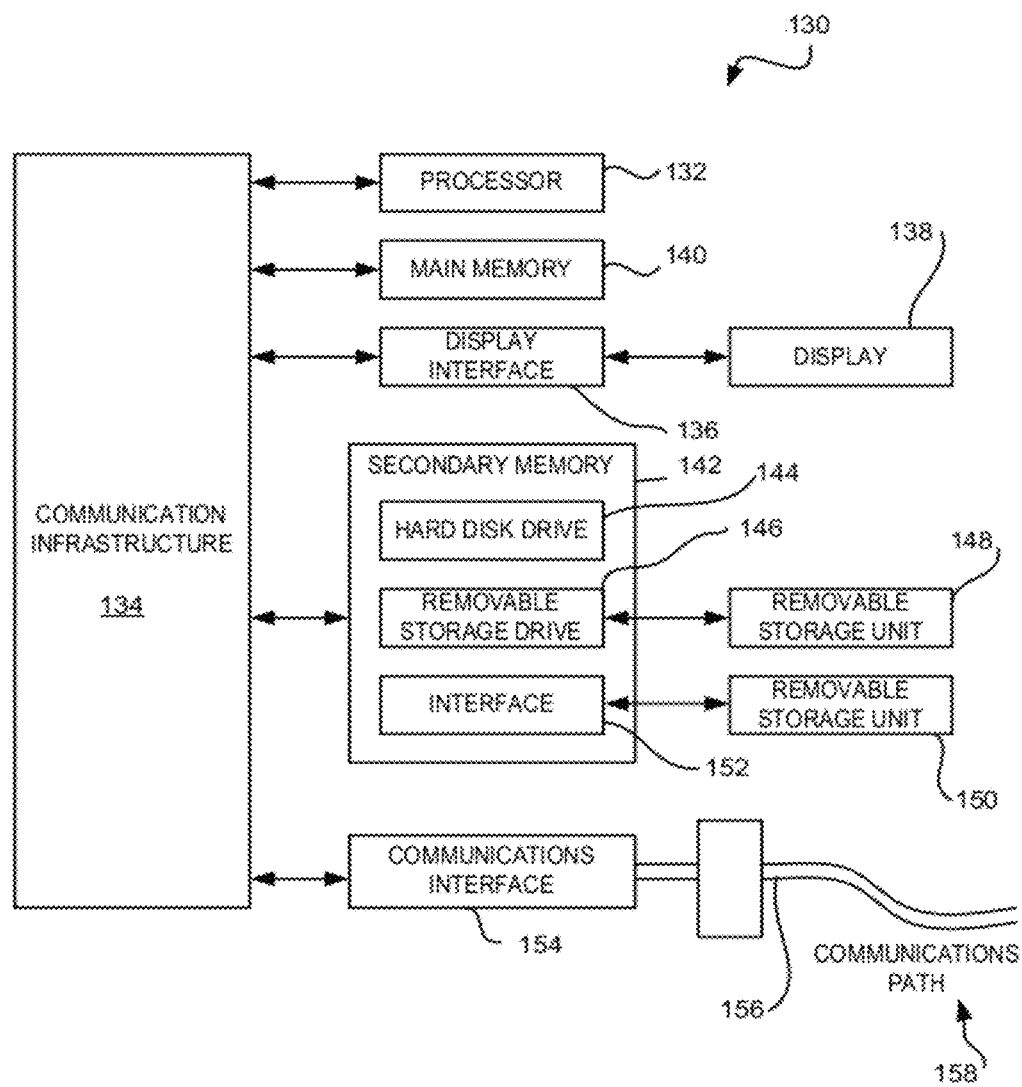
FIG. 5 is schematic diagram of a computer system used to implement at least some of the functionality provided by various implementations of the system depicted in FIGS. 1 to 4.

User Account information
Known suppliers and customers (names, trading names, ABNs, Phone #s, Addresses, business category, subcategory)
GL code assignment based on subcategory to subcategory, category to subcategory, subcategory to category, category to category
PCS
PCS associated data rules It will be appreciated from the foregoing that at least some of the elements subsystems 12 to 18 may be implemented using hardware, software or a combination thereof and may be implemented in one or more computer systems or processing systems, such as the computer system 130 depicted in FIG. 5.

Such computer systems 130 include one or more processors, such as the processor 132. The processor 132 is connected to a communication infrastructure 134. The computer system 130 may include a display interface 136 that forwards graphics, texts and other data from the communication infrastructure 134 for supply to the display unit 138. The computer system 130 may also include a main memory 140, preferably random access memory, and may also include a secondary memory 142.

The secondary memory 142 may include, for example, a hard disk drive 144, magnetic tape drive, optical disk drive, etc. The removable storage drive 146 reads from and/or writes to a removable storage unit 148 in a well known manner. The removable storage unit 148 represents a floppy disk, magnetic tape, optical disk, etc.

As will be appreciated, the removable storage unit 148 includes a computer usable storage medium having stored therein computer software in a form of a series of instructions to cause the processor 132 to carry out desired functionality. In alternative embodiments, the secondary memory 142 may include other similar means for allowing computer programs or instructions to be loaded into the computer system 130. Such means may include, for example, a removable storage unit 150 and interface 152.

The computer system 130 may also include a communications interface 154. Communications interface 154 allows software and data to be transferred between the computer system 132 and external devices. Examples of communication interface 154 may include a modem, a network interface, a communications port, a PCMIA slot and card etc. Software and data transferred via a communications interface 154 are in the form of signals 156 which may be electromagnetic, electronic, optical or other signals capable of being received by the communications interface 154. The signals are provided to communications interface 154 via a communications path 158 such as a wire or cable, fibre optics, phone line, cellular phone link, radio frequency or other communications channels.

Although in the above described embodiments the invention is implemented primarily using computer software, in other embodiments the invention may be implemented primarily in hardware using, for example, hardware components such as an application specific integrated circuit (ASICs). Implementation of a hardware state machine so as to perform the functions described herein will be apparent to persons skilled in the relevant art. In other embodiments, the invention may be implemented using a combination of both hardware and software.

The above-described automated accounting system 10 minimises the need for the manual data entry processes, the manual process of allocating or assigning each transaction to its counterpart in a double entry system or to an account in a chart of accounts for the purpose of financial reporting, and/or the need for unique codes and there use by both systems exchanging data on related parts of a transaction even in most cases where the limitations of the other patented systems would require manual intervention from the user.

The above-described automated accounting system 10 is especially helpful in eliminating or minimising the data entry of financial transactions associated with paper records. By accepting data inputs from a plurality of sources (accounting software systems, financial institution transaction data, data files uploaded by the user, paper transaction documents converted by the system, payroll supplier data files, payment gateway service providers, etc), the automated accounting system also eliminates the limitations of existing accounting systems which automatically manage only transactions recorded by a financial institution and only where all details are recorded and made available within a financial institutions data, where systems for all participants in a transaction are 'linked' or integrated and a pre-agreed common protocol is used for the formatting and exchange of data and/or for the use of a unique code by both participants in a transaction that is specific to one of those parties.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A financial transaction entry processing system comprising:
a record generation subsystem having:
   at least one processor; and
   at least one memory device which stores a plurality of instructions, which when executed by the at least one processor, cause the at least one processor to:
   (a) receive or generate at least one character string characterizing one or more financial transaction entries in a transaction document or a data file, wherein the transaction document is one of: an optical character recognized document known to have at least one error, an optical character recognized document unknown to have any errors, and a transaction document associated with a physical document, such that:
      (i) if the transaction document is received and if said transaction document is associated with the physical document and if a digital image of the physical document is available:
         (A) for each of at least one orientation of the available digital image of the physical document associated with said transaction document, execute an optical character recognition process, and
         (B) designate one of the at least one orientation in association with said transaction document, said designation being based on a quantity of characters recognized for said orientation and a quantity of character strings recognized for said orientation, and
      (ii) if the transaction document is received and if said transaction document is associated with the physical document and if a plurality of digital images of the physical document are available:
         (A) for each of the plurality of available digital images of the physical document associated with said transaction document, execute an optical character recognition process, and
         (B) designate one of the digital images in association with said transaction document, said designation being based on a quantity of characters recognized for said digital image and a quantity of character strings recognized for said digital image;
   (b) thereafter, analyze each character string of the transaction document or the data file to identify one or more transaction identifiers used in financial transactions, each of the one or more transaction identifiers being one of: a Preferred Character String and an Associated Preferred Character String Data;
   (c) analyze each character string of the transaction document or the data file to identify transaction data strings associated with each of the one or more identified transaction identifiers, each of the transaction data strings being one of: the Preferred Character String and the Associated Preferred Character String Data;
   (d) perform at least one of verifying or correcting the one or more transaction identifiers and transaction data strings by automatically applying at least one of stored correction rules or authentication rules; and
   (e) store transaction data, including the one or more transaction identifiers and associated transaction data strings, for each financial transaction in a database.

2. The financial transaction entry processing system according to claim 1, wherein when executed by the at least one processor, the plurality of instructions cause the at least one processor to perform optical character recognition on the transaction document to generate the at least one character string.

3. The financial transaction entry processing system according to claim 1, wherein when executed by the at least one processor, the plurality of instructions cause the at least one processor to:
analyze each character string of the transaction document or the data file to determine if the transaction document represents more than one transaction, and
if the transaction document represents more than one transaction, breaking the at least one character string of the transaction document into individual transaction substrings each corresponding to a single financial transaction.

4. The financial transaction entry processing system according to claim 1, wherein when executed by the at least one processor, the plurality of instructions cause the at least one processor to analyze a layout of one or more of the financial transaction entries and related information displayed on the transaction document to identify known patterns of common financial documents.

5. The financial transaction entry processing system according to claim 1, wherein the transaction document is an account statement.

6. The financial transaction entry processing system according to claim 1, wherein when executed by the at least one processor, the plurality of instructions cause the at least one processor to augment the stored transaction data with supplementary transaction data from supplementary data sources.

7. The financial transaction entry processing system according to claim 6, wherein the supplementary transaction data includes any one or more of: one or more parties engaged in a transaction, and the nature or type of the transaction.

8. The financial transaction entry processing system according to claim 6, wherein the supplementary data sources include publicly accessible databases.

9. The financial transaction entry processing system according to claim 1, wherein one or more of the transaction documents are physical documents.

10. The financial transaction entry processing system according to claim 9, wherein the record generation subsystem includes a document digitization module configured to digitize the physical documents.

11. The financial transaction entry processing system according to claim 1, wherein one or more of the transaction documents are electronic documents having a known digital document format.

12. A financial transaction entry processing comprising:
a record generation subsystem having:
   at least one processor; and
   at least one memory device which stores a plurality of instructions, which when executed by the at least one processor, cause the at least one processor to:
   (a) receive or generate at least one character string characterizing one or more financial transaction entries in a first transaction document or a first data file, wherein the first transaction document is one of: an optical character recognized document known to have at least one error, an optical character recognized document unknown to have any errors, and a transaction document associated with a physical document, such that:
  (i) if the first transaction document is received and if said first transaction document is associated with the physical document and if a digital image of the physical document is available:
    (A) for each of at least one orientation of the available digital image of the physical document associated with said first transaction document, execute an optical character recognition process, and
    (B) designate one of the at least one orientation in association with said first transaction document, said designation being based on a quantity of characters recognized for said orientation and a quantity of character strings recognized for said orientation, and
  (ii) if the first transaction document is received and if said first transaction document is associated with the physical document and if a plurality of digital images of the physical document are available:
    (A) for each of the plurality of available digital images of the physical document associated with said first transaction document, execute an optical character recognition process, and
    (B) designate one of the digital images in association with said first transaction document, said designation being based on a quantity of characters recognized for said digital image and a quantity of character strings recognized for said digital image;
(b) analyze each character string to identify one or more transaction identifiers used in financial transactions, each of the one or more transaction identifiers being one of: a Preferred Character String and an Associated Preferred Character String Data;
(c) thereafter, analyze each character string of the first transaction document or the first data file to identify transaction data strings associated with each of the one or more identified transaction identifiers, each of the transaction data strings being one of: the Preferred Character String and the Associated Preferred Character String Data;
(d) perform at least one of verifying or correcting the one or more transaction identifiers and transaction data strings by automatically applying at least one of stored correction rules or authentication rules;
(e) store transaction data, including the one or more transaction identifiers and associated transaction data strings, for each financial transaction in a database; and
(f) augment the one or more transaction identifiers and associated transaction data strings with supplementary data by accessing at least one of previously stored transaction data or one or more external databases.

13. The financial transaction entry processing system according to claim 12, which includes a reconciliation subsystem having at least one processor, and at least one memory device which stores a plurality of instructions, which when executed by the at least one processor, cause the at least one processor to reconcile the stored transaction data from the first transaction document or the first data file with the stored transaction data from one or more other transaction documents or data files, wherein the stored transaction data from the one or more other transaction documents or data files has been obtained via executing (a) to (d) on the one or more other transaction documents or data files.

14. The financial transaction entry processing system according to claim 13, wherein the previously stored transaction data used in (e) includes the stored transaction data from the one or more other transaction documents or data files.

15. A financial transaction entry processing system comprising:
  a record generation subsystem having:
    at least one processor; and
    at least one memory device which stores a plurality of instructions, which when executed by the at least one processor, cause the at least one processor to:
    (a) receive or generate at least one character string characterizing one or more financial transaction entries in a transaction document or a data file, wherein the transaction document is one of: an optical character recognized document known to have at least one error, an optical character recognized document unknown to have any errors, and a transaction document associated with a physical document, such that:
      (i) if the transaction document is received and if said transaction document is associated with the physical document and if a digital image of the physical document is available:
        (A) for each of at least one orientation of the available digital image of the physical document associated with said transaction document, execute an optical character recognition process, and
        (B) designate one of the at least one orientation in association with said transaction document, said designation being based on a quantity of characters recognized for said orientation and a quantity of character strings recognized for said orientation, and
      (ii) if the transaction document is received and if said transaction document is associated with the physical document and if a plurality of digital images of the physical document are available:
        (A) for each of the plurality of available digital images of the physical document associated with said transaction document, execute an optical character recognition process, and
        (B) designate one of the digital images in association with said transaction document, said designation being based on a quantity of characters recognized for said digital image and a quantity of character strings recognized for said digital image;
    (b) thereafter, analyze each character string of the transaction document or the data file to identify one or more transaction identifiers used in financial transactions, each of the one or more transaction identifiers being one of: a Preferred Character String and an Associated Preferred Character String Data;
    (c) thereafter, analyze each character string of the transaction document or the data file to identify transaction data strings associated with each of the one or more identified transaction identifiers, each of the transaction data strings being one of: the Preferred Character String and the Associated Preferred Character String Data;

(d) store transaction data, including the one or more transaction identifiers and associated transaction data strings, for each financial transaction in a database;

(e) perform at least one of verifying or correcting the one or more transaction identifiers and transaction data strings by automatically applying at least one of stored correction rules or authentication rules; and (f) categorize the one or more transaction identifiers and transaction data strings by carrying out a categorization process including a sequence of categorization decisions and actions which involve comparison of the one or more transaction identifiers and transaction data strings to at least one of previously stored transaction data or one or more external databases.

* * * * *